(12) United States Patent
Fukunaga

(10) Patent No.: US 10,138,991 B2
(45) Date of Patent: Nov. 27, 2018

(54) BICYCLE SPROCKET

(71) Applicant: SHIMANO INC., Sakai (JP)

(72) Inventor: Yasufumi Fukunaga, Sakai (JP)

(73) Assignee: SHIMANO INC., Sakai (JP)

( * ) Notice: Subject to any disclaimer, the term of this patent is extended or adjusted under 35 U.S.C. 154(b) by 153 days.

(21) Appl. No.: 15/265,808

(22) Filed: Sep. 14, 2016

(65) Prior Publication Data

US 2018/0073620 A1   Mar. 15, 2018

(51) Int. Cl.
F16H 55/12 (2006.01)
F16H 55/30 (2006.01)
B62M 9/10 (2006.01)

(52) U.S. Cl.
CPC ............... *F16H 55/30* (2013.01); *B62M 9/10* (2013.01)

(58) Field of Classification Search
CPC .......... B62M 9/10; B62M 9/105; B62M 9/12; F16H 55/30; F16H 55/303
USPC ........................................................ 474/160
See application file for complete search history.

(56) References Cited

U.S. PATENT DOCUMENTS

| | | | | |
|---|---|---|---|---|
| 4,813,916 A * | 3/1989 | Valin | ............... | B62M 9/10 474/152 |
| 5,192,249 A * | 3/1993 | Nagano | ............... | B62M 9/10 474/160 |
| 5,716,297 A * | 2/1998 | Bodmer | ............... | B62M 9/10 474/160 |
| 5,738,603 A * | 4/1998 | Schmidt | ............... | B62M 9/10 474/158 |
| 6,139,456 A * | 10/2000 | Lii | ............... | B62M 9/10 474/152 |
| 6,340,338 B1 * | 1/2002 | Kamada | ............... | B62M 9/10 474/152 |
| 8,066,603 B2 * | 11/2011 | Braedt | ............... | B62M 9/10 474/160 |
| 8,092,329 B2 * | 1/2012 | Wickliffe | ............... | B62M 9/105 474/160 |
| 8,096,908 B2 * | 1/2012 | Oishi | ............... | B62M 9/10 474/160 |
| 8,226,511 B2 * | 7/2012 | Kamada | ............... | B62M 9/10 474/152 |

(Continued)

FOREIGN PATENT DOCUMENTS

| | | |
|---|---|---|
| EP | 0047927 | 3/1982 |
| JP | 62-23187 U | 2/1987 |
| JP | 62-65387 U | 4/1987 |

*Primary Examiner* — Henry Y Liu
(74) *Attorney, Agent, or Firm* — Mori & Ward, LLP

(57) ABSTRACT

A bicycle sprocket comprises a sprocket body, a shifting facilitation area, and a plurality of chain-driving teeth. The plurality of chain-driving teeth comprises a reference tooth and a first tooth. The reference tooth has a reference radial length defined radially outward from a root circle of the bicycle sprocket. The first tooth has a first radial length defined radially outward from the root circle of the bicycle sprocket. The first radial length is larger than the reference radial length. The first tooth is adjacent to the reference tooth in a circumferential direction defined about the rotational center axis without another tooth between the first tooth and the reference tooth. The first tooth is provided on a downstream side of the reference tooth in a driving rotational direction in which the bicycle sprocket is rotated about the rotational center axis during pedaling.

23 Claims, 18 Drawing Sheets

(56) References Cited

U.S. PATENT DOCUMENTS

| | | | | |
|---|---|---|---|---|
| 8,550,944 B2* | 10/2013 | Esquibel | ............... | B62M 9/10 |
| | | | | 474/160 |
| 8,617,015 B2* | 12/2013 | Wickliffe | ............... | F16H 55/30 |
| | | | | 474/140 |
| 9,376,165 B2* | 6/2016 | Oishi | ............... | B62M 9/10 |
| 9,463,844 B2* | 10/2016 | Fukunaga | ............... | B62M 9/10 |
| 9,677,658 B2* | 6/2017 | Wickliffe | ............... | B62M 9/10 |
| 9,885,409 B1* | 2/2018 | Fukunaga | ............... | F16H 55/30 |
| 9,915,336 B1* | 3/2018 | Fukunaga | ............... | F16H 55/30 |
| 2006/0154767 A1* | 7/2006 | Kamada | ............... | B62M 9/10 |
| | | | | 474/160 |
| 2007/0054768 A1* | 3/2007 | Miyazawa | ............... | F16H 55/30 |
| | | | | 474/152 |
| 2010/0004081 A1* | 1/2010 | Braedt | ............... | B62M 9/10 |
| | | | | 474/160 |
| 2011/0092327 A1* | 4/2011 | Oishi | ............... | B62M 9/10 |
| | | | | 474/160 |
| 2013/0139642 A1* | 6/2013 | Reiter | ............... | B62M 9/105 |
| | | | | 74/594.2 |
| 2016/0059931 A1* | 3/2016 | Fukunaga | ............... | B62M 9/10 |
| | | | | 474/158 |

* cited by examiner ical length defined by the first upstream radially-

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body, a shifting facilitation area, and a plurality of chain-driving teeth. The sprocket body includes a radially outer periphery provided about a rotational center axis of the bicycle sprocket. The shifting facilitation area is to facilitate a shifting operation of the bicycle chain. The shifting facilitation area has a shifting facilitation recess. The plurality of chain-driving teeth are provided on the radially outer periphery to engage with a bicycle chain. The plurality of chain-driving teeth comprises a reference tooth and a first tooth. The reference tooth is provided in the shifting facilitation area. The reference tooth has a reference radial length defined radially outward from a root circle of the bicycle sprocket. The first tooth is provided in the shifting facilitation area. The first tooth has a first radial length defined radially outward from the root circle of the bicycle sprocket. The first radial length is larger than the reference radial length. The first tooth is adjacent to the reference tooth in a circumferential direction defined about the rotational center axis without another tooth between the first tooth and the reference tooth. The first tooth is provided on a downstream side of the reference tooth in a driving rotational direction in which the bicycle sprocket is rotated about the rotational center axis during pedaling. The shifting facilitation recess extends at least from the reference tooth to the first tooth.

With the bicycle sprocket according to the first aspect, it is possible to delay a timing at which the first tooth is disengaged from the bicycle chain in comparison with the reference tooth since the first radial length of the first tooth is larger than the reference radial length of the reference tooth. This offsets a disengagement position at which the first tooth is disengaged from the bicycle chain from a position at which an axial force applied from the bicycle chain to the first tooth is larger than at the disengagement position during pedaling. This can reduce an axial force applied from the bicycle chain to the first tooth when the first tooth is disengaged from the bicycle chain when the bicycle chain is shifted from the bicycle sprocket to an adjacent sprocket. Thus, it is possible to smoothen a shifting operation of the bicycle chain.

In accordance with a second aspect of the present invention, the bicycle sprocket according to the first aspect is configured so that the first radial length is larger than the reference radial length by a radial length ranging from 0.5 mm to 1.0 mm.

With the bicycle sprocket according to the second aspect, it is possible to certainly smoothen the shifting operation of the bicycle chain.

In accordance with a third aspect of the present invention, the bicycle sprocket according to any one of the above aspects is configured so that the first tooth includes a first downstream tooth bottom, a first upstream tooth bottom, a first downstream circumferential surface, a first upstream circumferential surface, a first downstream outer corner, and a first upstream outer corner. The first downstream tooth bottom is provided on the radially outer periphery of the sprocket body to define the root circle. The first upstream tooth bottom is provided on the radially outer periphery of the sprocket body to define the root circle. The first downstream circumferential surface faces in the driving rotational direction. The first downstream circumferential surface extends from the first downstream tooth bottom to a first downstream radially-outer end of the first tooth. The first upstream circumferential surface faces in a reversing rotational direction opposite to the driving rotational direction. The first upstream circumferential surface extends from the first upstream tooth bottom to a first upstream radially-outer end of the first tooth. The first downstream outer corner is provided at the first downstream radially-outer end in the first downstream circumferential surface. The first upstream outer corner is provided at the first upstream radially-outer end in the first upstream circumferential surface. The first upstream outer corner is positioned radially outward from the first downstream outer corner.

With the bicycle sprocket according to the third aspect, it is possible to reduce the axial force applied from the bicycle chain to the first tooth during the shifting operation with saving weight of the bicycle sprocket in comparison with a case where the first upstream outer corner is positioned radially inward from the first downstream outer corner.

In accordance with a fourth aspect of the present invention, the bicycle sprocket according to any one of the above aspects is configured so that the first downstream outer corner includes a first downstream curved edge having a first downstream curvature radius. The first upstream outer corner includes a first upstream curved edge having a first upstream curvature radius. The first upstream curvature radius is different from the first downstream curvature radius.

With the bicycle sprocket according to the fourth aspect, it is possible to improve flexibility of the design of the bicycle sprocket.

In accordance with a fifth aspect of the present invention, the bicycle sprocket according to any one of the above aspects is configured so that the first upstream curvature radius is larger than the first downstream curvature radius.

With the bicycle sprocket according to the fifth aspect, it is possible to effectively reduce the axial force applied from the bicycle chain to the first tooth during the shifting operation with saving weight of the bicycle sprocket.

In accordance with a sixth aspect of the present invention, the bicycle sprocket according to any one of the above aspects is configured so that the first upstream curvature radius ranges from 0.5 mm to 3.0 mm.

With the bicycle sprocket according to the sixth aspect, it is possible to certainly smoothen the shifting operation of the bicycle chain with saving weight of the bicycle sprocket.

In accordance with a seventh aspect of the present invention, the bicycle sprocket according to any one of the above aspects is configured so that the first tooth includes a first radially-outer end defined by the first upstream radially-outer end and the first downstream radially-outer end to extend between the first upstream outer corner and the first downstream outer corner.

With the bicycle sprocket according to the seventh aspect, it is possible to provide a necessary strength of the first tooth with reducing the axial force applied from the bicycle chain to the first tooth during the shifting operation.

In accordance with an eighth aspect of the present invention, the bicycle sprocket according to any one of the above aspects is configured so that the first radial length is radially defined between the root circle and the first upstream outer corner.

With the bicycle sprocket according to the eighth aspect, it is possible to more certainly smoothen the shifting operation of the bicycle chain with saving weight of the bicycle sprocket.

In accordance with a ninth aspect of the present invention, the bicycle sprocket according to any one of the above aspects further comprises a first side surface and a second side surface. The first side surface faces in a first axial direction parallel to the rotational center axis. The second side surface faces in a second axial direction that is an axially reverse direction with respect to the first axial direction. The shifting facilitation area is disposed on the first side surface.

With the bicycle sprocket according to the ninth aspect, it is possible to more smoothly shift the bicycle chain from the bicycle sprocket to the adjacent sprocket.

In accordance with a tenth aspect of the present invention, the bicycle sprocket according to any one of the above aspects is configured so that the plurality of chain-driving teeth comprise a second tooth provided in the shifting facilitation area. The second tooth has a second radial length defined radially outward from the root circle. The second radial length is larger than the reference radial length.

With the bicycle sprocket according to the tenth aspect, it is possible to delay a timing at which the second tooth is disengaged from the bicycle chain in comparison with the reference tooth since the first radial length of the second tooth is larger than the reference radial length of the reference tooth. This offsets a disengagement position at which the second tooth is disengaged from the bicycle chain from a position at which an axial force applied from the bicycle chain to the second tooth is larger than at the disengagement position during pedaling. This can reduce an axial force applied from the bicycle chain to the second tooth when the second tooth is disengaged from the bicycle chain when the bicycle chain is shifted from the bicycle sprocket to an adjacent sprocket. Thus, it is possible to more smoothly shift the bicycle chain from the bicycle sprocket to the adjacent sprocket.

In accordance with an eleventh aspect of the present invention, the bicycle sprocket according to any one of the above aspects is configured so that the second radial length is equal to the first radial length.

With the bicycle sprocket according to the eleventh aspect, it is possible to effectively smoothen the shifting operation of the bicycle chain.

In accordance with a twelfth aspect of the present invention, the bicycle sprocket according to any one of the above aspects is configured so that the second radial length is larger than the reference radial length by a radial length ranging from 0.5 mm to 1.0 mm.

With the bicycle sprocket according to the twelfth aspect, it is possible to certainly smoothen the shifting operation of the bicycle chain.

In accordance with a thirteenth aspect of the present invention, the bicycle sprocket according to any one of the above aspects is configured so that the second tooth is provided on a downstream side of the first tooth in a driving rotational direction in which the bicycle sprocket is rotated about the rotational center axis during pedaling.

With the bicycle sprocket according to the thirteenth aspect, it is possible to effectively smoothen the shifting operation of the bicycle chain.

In accordance with a fourteenth aspect of the present invention, the bicycle sprocket according to any one of the above aspects is configured so that the second tooth is adjacent to the first tooth in the driving rotational direction without another tooth between the reference tooth and the second tooth.

With the bicycle sprocket according to the fourteenth aspect, it is possible to more effectively smoothen the shifting operation of the bicycle chain.

In accordance with a fifteenth aspect of the present invention, the bicycle sprocket according to any one of the above aspects is configured so that the second tooth includes a second downstream tooth bottom, a second upstream tooth bottom, a second downstream circumferential surface, a second upstream circumferential surface, a second downstream outer corner, and a second upstream outer corner. The second downstream tooth bottom is provided on the radially outer periphery of the sprocket body to define the root circle. The second upstream tooth bottom is provided on the radially outer periphery of the sprocket body to define the root circle. The second downstream circumferential surface faces in the driving rotational direction. The second downstream circumferential surface extends from the second downstream tooth bottom to a second downstream radially-outer end of the second tooth. The second upstream circumferential surface faces in a reversing rotational direction opposite to the driving rotational direction. The second upstream circumferential surface extends from the second upstream tooth bottom to a second upstream radially-outer end of the second tooth. The second downstream outer corner is provided at the second downstream radially-outer end of the second downstream circumferential surface. The second upstream outer corner is provided at the second upstream radially-outer end of the second upstream circumferential surface. The second upstream outer corner is positioned radially outward from the second downstream outer corner.

With the bicycle sprocket according to the fifteenth aspect, it is possible to reduce the axial force applied from the bicycle chain to the second tooth during the shifting operation with saving weight of the bicycle sprocket in comparison with a case where the second upstream outer corner is positioned radially inward from the second downstream outer corner.

In accordance with a sixteenth aspect of the present invention, the bicycle sprocket according to any one of the above aspects is configured so that the second downstream outer corner includes a second downstream curved edge having a second downstream curvature radius. The second upstream outer corner includes a second upstream curved edge having a second upstream curvature radius. The second upstream curvature radius is different from the second downstream curvature radius.

With the bicycle sprocket according to the sixteenth aspect, it is possible to improve flexibility of the design of the bicycle sprocket.

In accordance with a seventeenth aspect of the present invention, the bicycle sprocket according to any one of the above aspects is configured so that the second upstream curvature radius is larger than the second downstream curvature radius.

With the bicycle sprocket according to the seventeenth aspect, it is possible to effectively reduce the axial force applied from the bicycle chain to the second tooth during the shifting operation with saving weight of the bicycle sprocket.

In accordance with a eighteenth aspect of the present invention, the bicycle sprocket according to any one of the above aspects is configured so that the second upstream curvature radius ranges from 0.5 mm to 3.0 mm.

With the bicycle sprocket according to the eighteenth aspect, it is possible to certainly smoothen the shifting operation of the bicycle chain with saving weight of the bicycle sprocket.

In accordance with a nineteenth aspect of the present invention, the bicycle sprocket according to any one of the above aspects is configured so that the second tooth includes a second radially-outer end defined by the second upstream radially-outer end and the second downstream radially-outer end to extend between the second upstream outer corner and the second downstream outer corner.

With the bicycle sprocket according to the nineteenth aspect, it is possible to provide a necessary strength of the second tooth with reducing the axial force applied from the bicycle chain to the second tooth during the shifting operation.

In accordance with a twentieth aspect of the present invention, the bicycle sprocket according to any one of the above aspects is configured so that the second radial length is radially defined between the root circle and the second upstream outer corner.

With the bicycle sprocket according to the twentieth aspect, it is possible to more certainly smoothen the shifting operation of the bicycle chain with saving weight of the bicycle sprocket.

In accordance with a twenty-first aspect of the present invention, the bicycle sprocket according to any one of the above aspects is configured so that the shifting facilitation area includes an upshifting facilitation area to facilitate an upshifting operation from the bicycle sprocket to a smaller sprocket adjacent to the bicycle sprocket without another sprocket between the smaller sprocket and the bicycle sprocket in the axial direction.

With the bicycle sprocket according to the twenty-first aspect, it is possible to smoothen the upshifting operation of the bicycle chain.

In accordance with a twenty-second aspect of the present invention, the bicycle sprocket according to any one of the above aspects is configured so that the shifting facilitation area includes a downshifting facilitation area to facilitate a downshifting operation from a smaller sprocket to the bicycle sprocket. The smaller sprocket is adjacent to the bicycle sprocket without another sprocket between the smaller sprocket and the bicycle sprocket in the axial direction.

With the bicycle sprocket according to the twenty-second aspect, it is possible to smoothen the downshifting operation of the bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
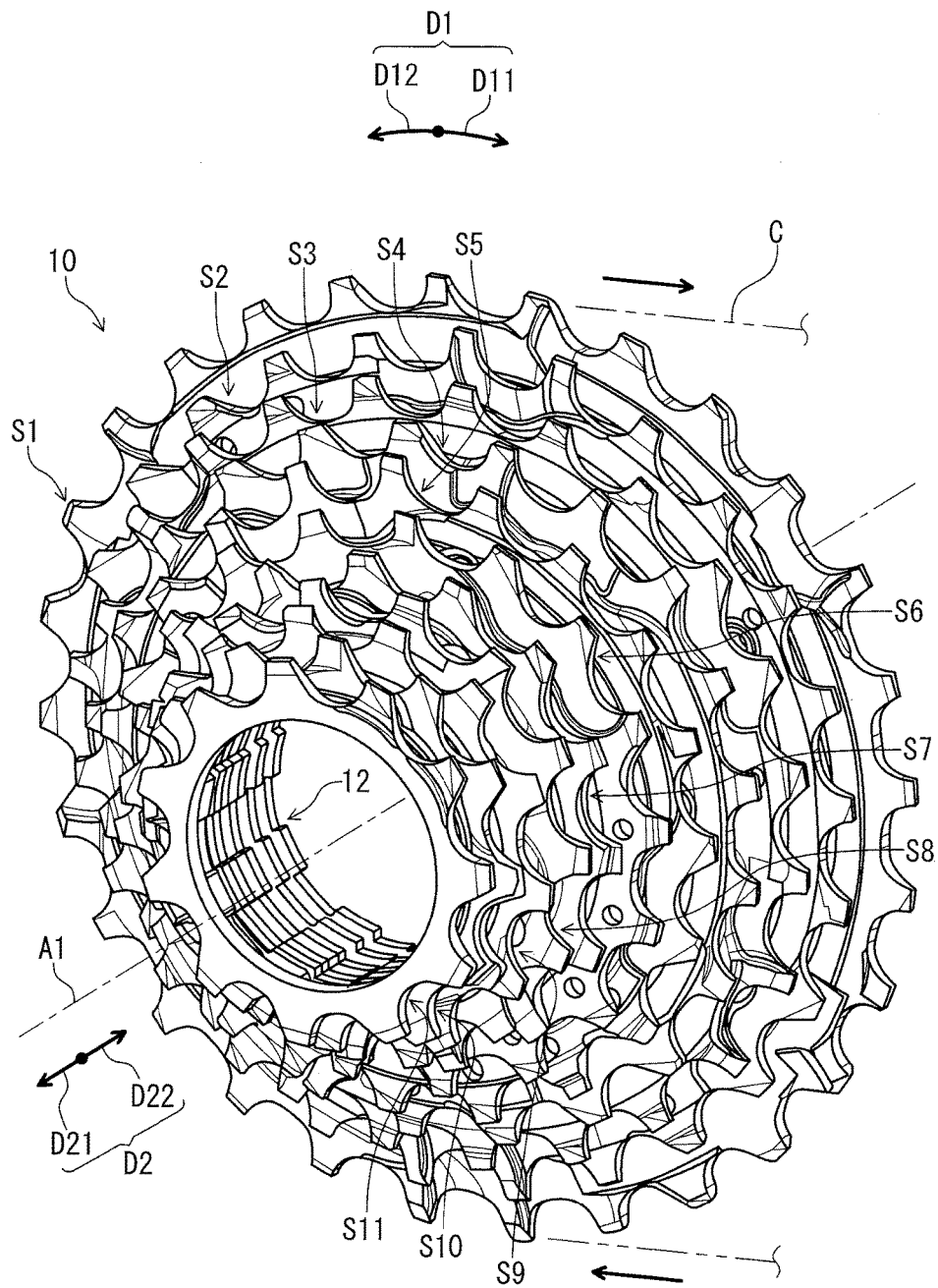
FIG. 1 is a perspective view of a bicycle multiple sprocket assembly including a bicycle sprocket in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle multiple sprocket assembly 10 including a bicycle sprocket in accordance with a first embodiment is illustrated. The bicycle multiple sprocket assembly 10 is configured to engage with a bicycle chain C. In this embodiment, the bicycle multiple sprocket assembly 10 comprises eleven bicycle sprockets S1 to S11. The bicycle multiple sprocket assembly 10 has a rotational center axis A1. The bicycle multiple sprocket assembly 10 is rotatable about the rotational center axis A1 in a driving rotational direction D11 during the pedaling. The driving rotational direction D11 is defined along a circumferential direction D1 of the bicycle multiple sprocket assembly 10.

Figure 2:
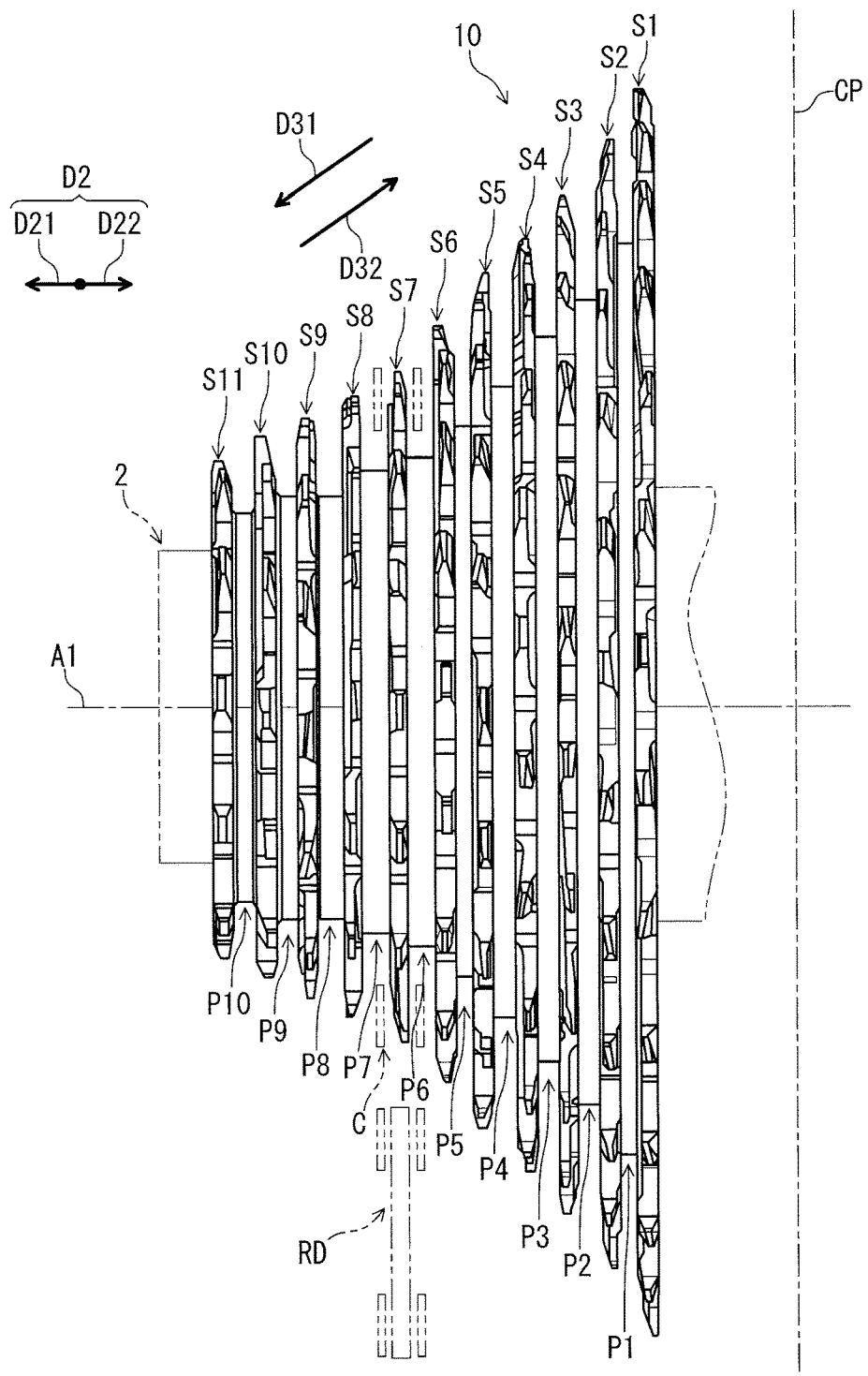
FIG. 2 is a front elevational view of the bicycle multiple sprocket assembly.

As seen in FIG. 1, the bicycle multiple sprocket assembly 10 further comprises a hub engagement structure 12 configured to engage with a bicycle hub assembly 2 (FIG. 2). While the bicycle multiple sprocket assembly 10 is a bicycle rear sprocket assembly in the illustrated embodiment, structures of the bicycle multiple sprocket assembly 10 can be applied to a front sprocket assembly if needed and/or desired. Each of the bicycle sprockets S1 to S11 is a bicycle rear sprocket in this embodiment, and the structures of the bicycle sprockets S1 to S11 can be applied to a bicycle front sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle multiple sprocket assembly 10 or the bicycle sprockets S1 to S11, should be interpreted relative to the bicycle equipped with the bicycle multiple sprocket assembly 10 or the bicycle sprockets S1 to S11 as used in an upright riding position on a horizontal surface.

As seen in FIG. 2, the bicycle sprockets S1 to S11 are arranged in an axial direction D2 parallel to the rotational center axis A1. The bicycle sprockets S1 to S11 are spaced apart from each other in the axial direction D2. The bicycle multiple sprocket assembly 10 includes spacers P1 to P10. Each of the spacers P1 to P10 is arranged between adjacent two sprockets of the bicycle sprockets S1 to S11. Instead of such spacers, a sprocket support member to which a plurality of bicycle sprockets are mounted can also be used.

The bicycle sprocket S1 has an outer diameter which is largest in the bicycle sprockets S1 to S11. The bicycle sprocket S11 has an outer diameter which is smallest in the bicycle sprockets S1 to S11. The bicycle sprocket S1 is closer to a bicycle center plane CP of a bicycle frame (not shown) than the bicycle sprocket S11 in a state where the bicycle multiple sprocket assembly 10 is mounted to the bicycle hub assembly 2. For example, upshifting occurs when the bicycle chain C is shifted by a rear derailleur (not shown) from a larger sprocket to a neighboring smaller sprocket in an upshifting direction D31. Downshifting occurs when the bicycle chain C is shifted by the rear derailleur from a small sprocket to a neighboring larger sprocket in a downshifting direction D32.

The bicycle sprockets S1 to S11 have substantially the same structure as each other. The bicycle sprocket S7 will be described in detail below, and other bicycle sprockets will not be described in detail here for the sake of brevity.

As seen in FIGS. 3 to 6, the bicycle sprocket S7 comprises a sprocket body 14 and a plurality of chain-driving teeth 16. The sprocket body 14 includes a radially outer periphery 18 provided about a rotational center axis A1 of the bicycle sprocket S7. The plurality of chain-driving teeth 16 are provided on the radially outer periphery 18 to engage with the bicycle chain C. The sprocket body 14 is configured to be rotatable about the rotational center axis A1. The sprocket body 14 has an annular shape. The plurality of chain-driving teeth 16 extend radially outward from the radially outer periphery 18 of the sprocket body 14. The bicycle sprocket S7 comprises a hub engagement portion 20. The hub engagement portion 20 is provided on an inner periphery of the sprocket body 14 to engage with the bicycle hub assembly 2 (FIG. 2). The hub engagement portion 20 partly constitutes the hub engagement structure 12 (FIG. 2).

Figure 3:
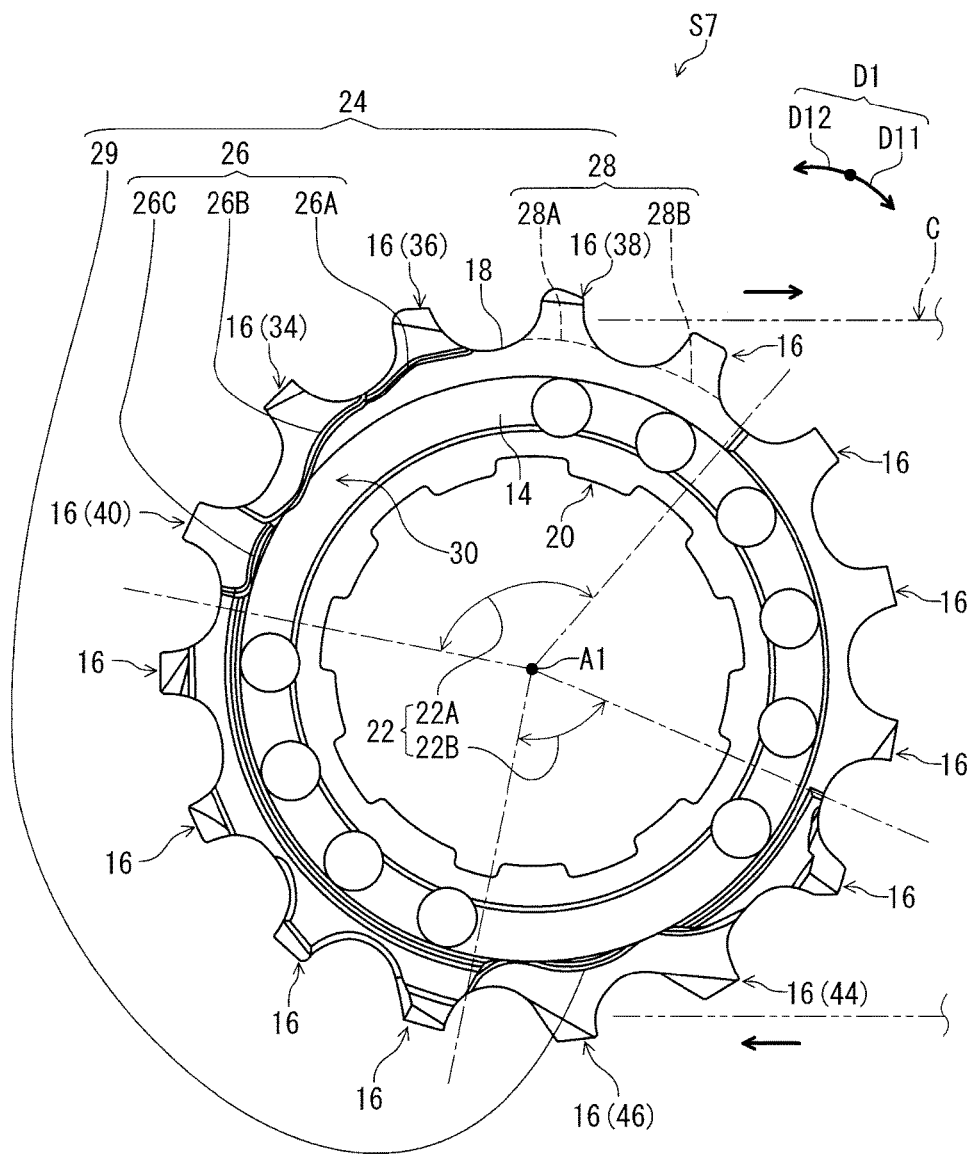
FIG. 3 is a side elevational view of the bicycle sprocket of the bicycle multiple sprocket assembly illustrated in FIG. 1.

As seen in FIG. 3, the bicycle sprocket S7 comprises a shifting facilitation area 22 to facilitate a shifting operation of the bicycle chain C. In this embodiment, the shifting facilitation area 22 includes an upshifting facilitation area 22A to facilitate an upshifting operation from the bicycle sprocket S7 to a smaller sprocket S8 adjacent to the bicycle sprocket S7 without another sprocket between the smaller sprocket S8 and the bicycle sprocket S7 in the axial direction D2. The shifting facilitation area 22 includes a downshifting facilitation area 22B to facilitate a downshifting operation from the smaller sprocket S8 to the bicycle sprocket S7. The shifting facilitation area 22 is defined about the rotational center axis A1.

As seen in FIG. 3, the shifting facilitation area 22 has a shifting facilitation recess 24. The shifting facilitation recess 24 includes an upshifting facilitation recess 26 to facilitate the upshifting operation. In this embodiment, the upshifting facilitation recess 26 is configured to reduce interference between the bicycle sprocket S7 and the bicycle chain C is the upshifting operation. The upshifting facilitation recess 26 is provided in the upshifting facilitation area 22A.

Figure 5:
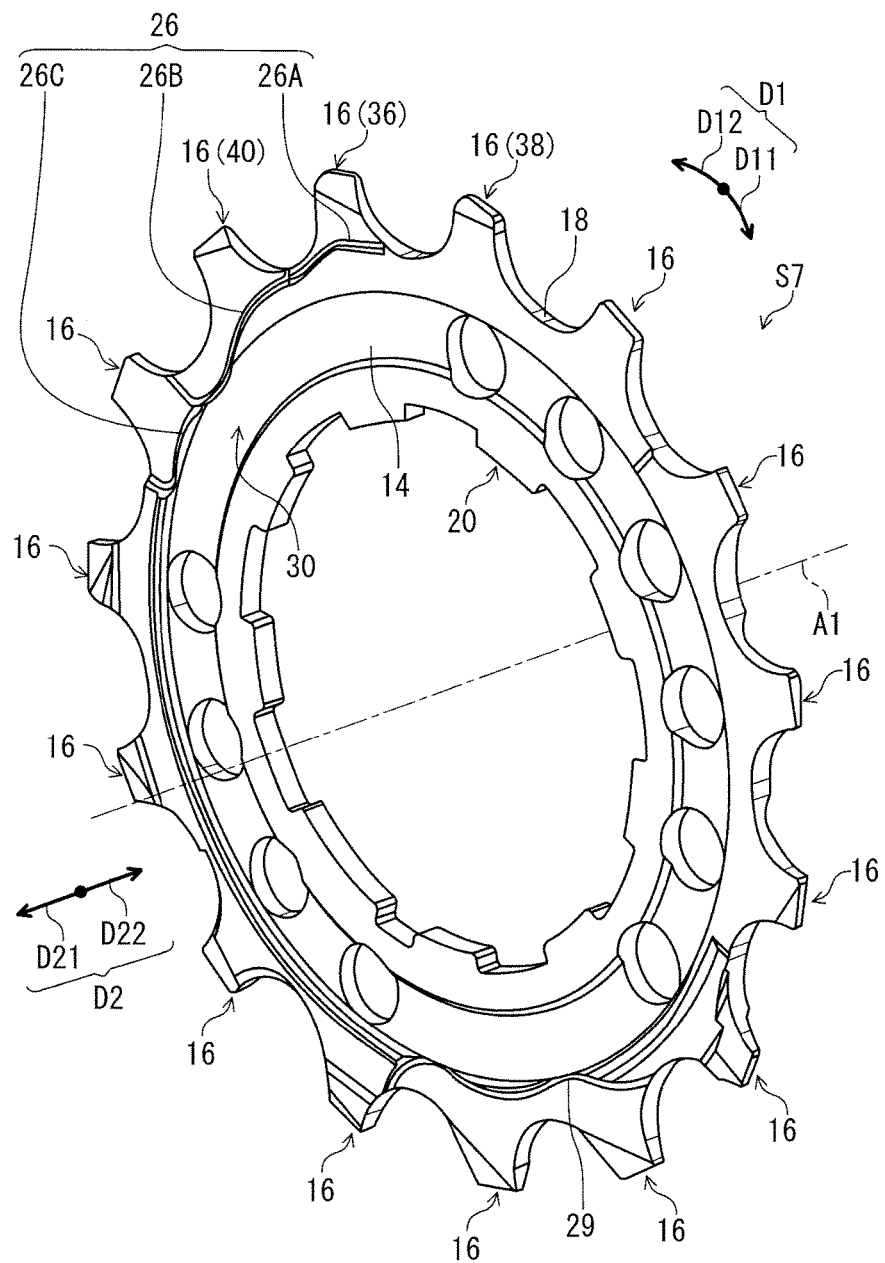
FIG. 5 is a perspective view of the bicycle sprocket of the bicycle multiple sprocket assembly illustrated in FIG. 1.

As seen in FIGS. 3 and 5, the upshifting facilitation recess 26 includes a first upshifting facilitation recess 26A, a second upshifting facilitation recess 26B, and a third upshifting facilitation recess 26C. The first upshifting facilitation recess 26A is provided on a downstream side of the second upshifting facilitation recess 26B in the driving rotational direction D11. The second upshifting facilitation recess 26B is provided on a downstream side of the third upshifting facilitation recess 26C in the driving rotational direction D11. The second upshifting facilitation recess 26B is provided between the first upshifting facilitation recess 26A and the third upshifting facilitation recess 26C in the circumferential direction D1. The first to third upshifting facilitation recesses 26A to 26C are continuously provided in the circumferential direction D1. However, the shape of the upshifting facilitation recess 26 is not limited to this embodiment.

Figure 4:
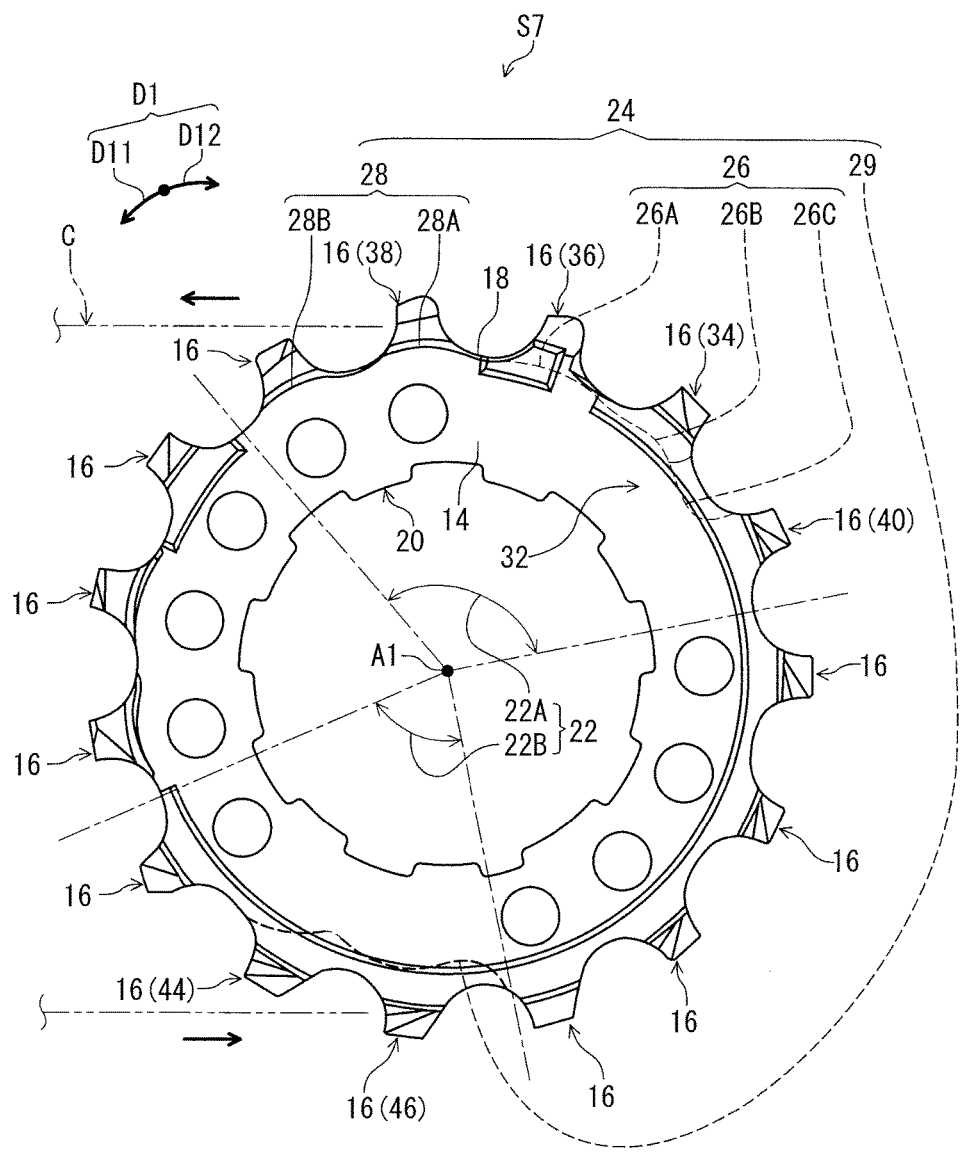
FIG. 4 is another side elevational view of the bicycle sprocket of the bicycle multiple sprocket assembly illustrated in FIG. 1.

As seen in FIG. 4, the shifting facilitation recess 24 includes an additional upshifting facilitation recess 28 to facilitate the upshifting operation. In this embodiment, the additional upshifting facilitation recess 28 is configured to facilitate an axial movement of the bicycle chain C relative to the bicycle sprocket S7 to smoothly disengage the bicycle chain C from the bicycle sprocket S7 in the upshifting operation. The additional upshifting facilitation recess 28 is provided in the upshifting facilitation area 22A.

Figure 6:
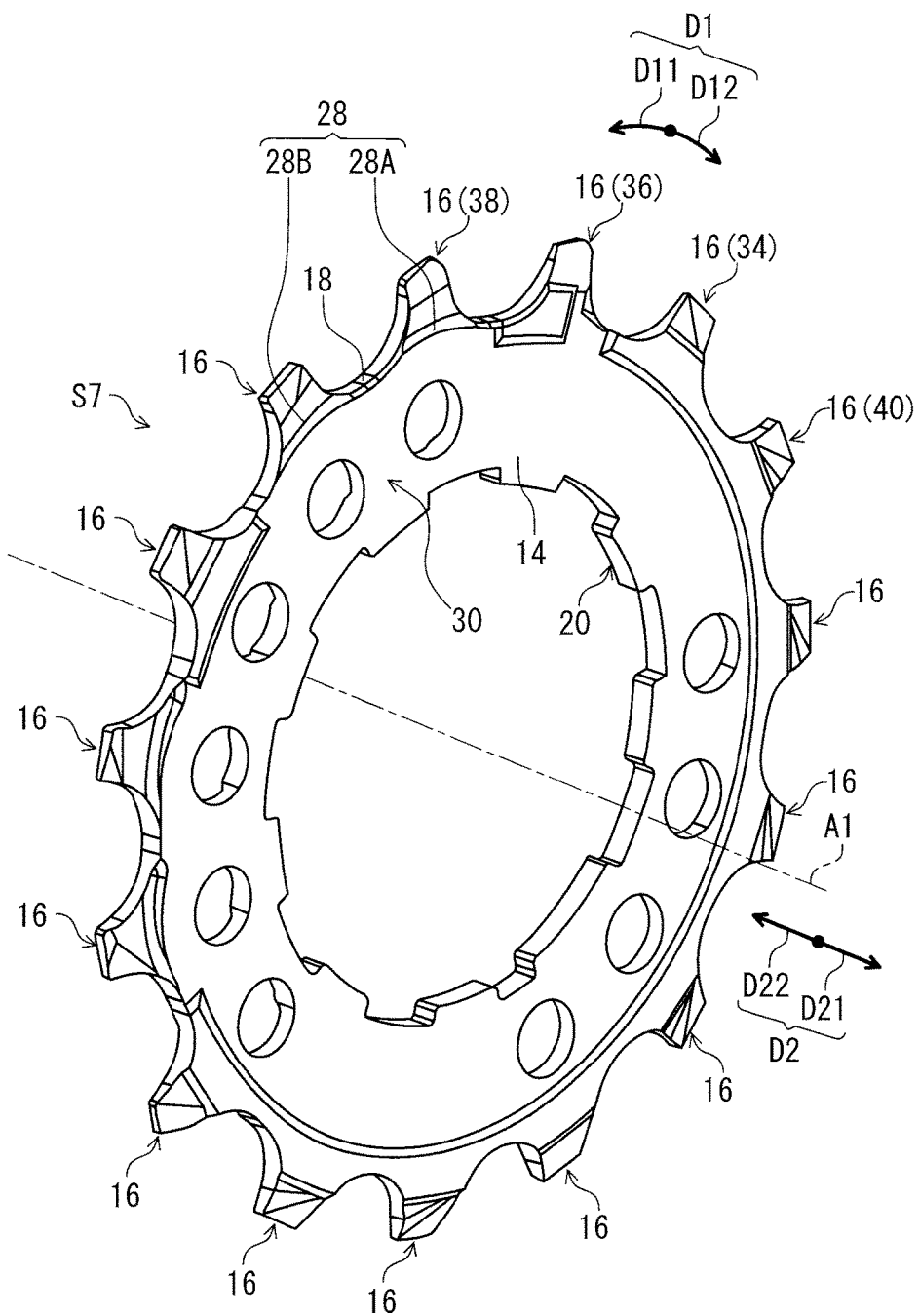
FIG. 6 is another perspective view of the bicycle sprocket of the bicycle multiple sprocket assembly illustrated in FIG. 1.

As seen in FIGS. 4 and 6, the additional upshifting facilitation recess 28 includes a first additional upshifting facilitation recess 28A and a second additional upshifting facilitation recess 28B. The first additional upshifting facilitation recess 28A is provided on an upstream side of the second additional upshifting facilitation recess 28B in the driving rotational direction D11. The first additional upshifting facilitation recess 28A is separately provided from the second additional upshifting facilitation recess 28B in the circumferential direction D1. However, the shape of the additional upshifting facilitation recess 28 is not limited to this embodiment.

As seen in FIG. 3, the shifting facilitation recess 24 includes a downshifting facilitation recess 29 to facilitate the downshifting operation. In this embodiment, the downshifting facilitation recess 29 is configured to reduce interference between the bicycle sprocket S7 and the bicycle chain C is the downshifting operation. The downshifting facilitation recess 29 is provided in the downshifting facilitation area 22B. The downshifting facilitation recess 29 can be omitted from the shifting facilitation recess 24.

Figure 7:
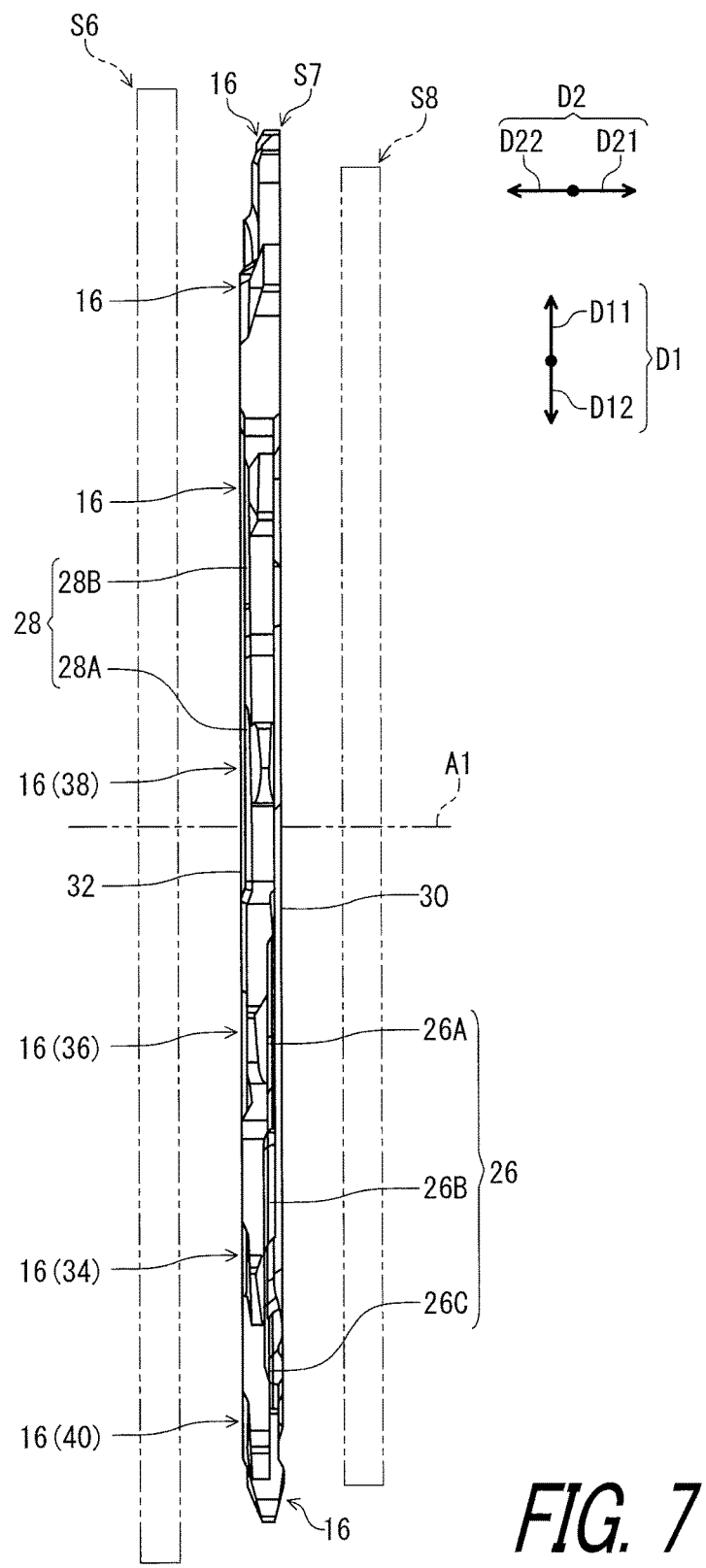
FIG. 7 is a plan view of the bicycle sprocket of the bicycle multiple sprocket assembly illustrated in FIG. 1.

As seen in FIG. 7, the bicycle sprocket S7 further comprises a first side surface 30 and a second side surface 32. The first side surface 30 faces in a first axial direction D21 parallel to the rotational center axis A1. The second side surface 32 faces in a second axial direction D22 that is an axially reverse direction with respect to the first axial direction D21. The shifting facilitation area 22 is disposed on the first side surface 30. The first side surface 30 faces a smaller sprocket S8 in the axial direction D2 without another sprocket between the first side surface 30 and the smaller sprocket S8. The second side surface 32 faces a larger sprocket S6 in the axial direction D2 without another sprocket between the second side surface 32 and the larger sprocket S6.

Figure 8:
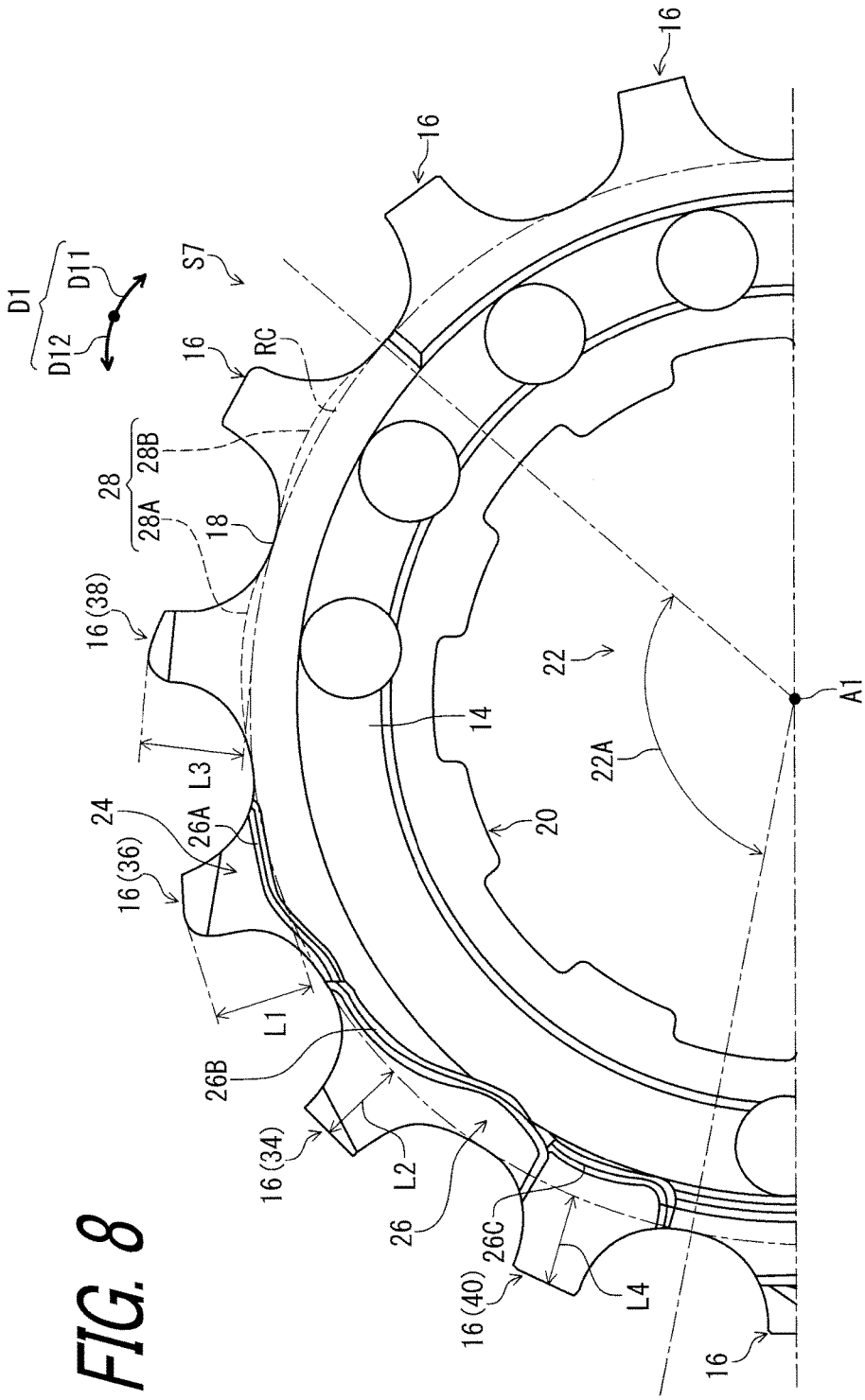
FIG. 8 is a partial side elevational view of the bicycle sprocket of the bicycle multiple sprocket assembly illustrated in FIG. 1.

As seen in FIG. 8, the plurality of chain-driving teeth 16 comprises a reference tooth 34 and a first tooth 36. The reference tooth 34 is provided in the shifting facilitation area 22. The first tooth 36 is provided in the shifting facilitation area 22. In this embodiment, the reference tooth 34 and the first tooth 36 are provided in the upshifting facilitation area 22A. However, the reference tooth 34 and the first tooth 36 can be provided in the downshifting facilitation area 22B (FIG. 3).

The first tooth 36 is adjacent to the reference tooth 34 in the circumferential direction D1 defined about the rotational center axis A1 without another tooth between the first tooth 36 and the reference tooth 34. The first tooth 36 is provided on a downstream side of the reference tooth 34 in the driving rotational direction D11 in which the bicycle sprocket S7 is rotated about the rotational center axis A1 during pedaling. The shifting facilitation recess 24 extends at least from the reference tooth 34 to the first tooth 36. In this embodiment, the upshifting facilitation recess 26 extends at least from the reference tooth 34 to the first tooth 36 in the circumferential direction D1. The first tooth 36 is provided in the first upshifting facilitation recess 26A. The reference tooth 34 is provided in the second upshifting facilitation recess 26B. The first upshifting facilitation recess 26A is provided on the first tooth 36. The second upshifting facilitation recess 26B is provided on the reference tooth 34.

The plurality of chain-driving teeth 16 comprise a second tooth 38 provided in the shifting facilitation area 22. The second tooth 38 is provided on a downstream side of the first tooth 36 in the driving rotational direction D11 in which the bicycle sprocket S7 is rotated about the rotational center axis A1 during pedaling. The second tooth 38 is adjacent to the first tooth 36 in the driving rotational direction D11 without another tooth between the reference tooth 34 and the second tooth 38. In this embodiment, the second tooth 38 has an outline which is substantially identical to an outline of the first tooth 36 when viewed from the axial direction D2. However, the second tooth 38 can have an outline different from the outline of the first tooth 36. The second tooth 38 can be omitted from the bicycle sprocket S7.

As seen in FIG. 8, the plurality of chain-driving teeth 16 comprises an additional reference tooth 40. The additional reference tooth 40 is provided in the shifting facilitation area 22. The additional reference tooth 40 is adjacent to the additional reference tooth 40 in the circumferential direction D1 without another tooth between the first tooth 36 and the additional reference tooth 40. The reference tooth 34 is provided on a downstream side of the additional reference tooth 40 in the driving rotational direction D11. The reference tooth 34 is provided between the first tooth 36 and the additional reference tooth 40 in the circumferential direction D1.

The shifting facilitation recess 24 extends from the additional reference tooth 40 to the first tooth 36. Specifically, the upshifting facilitation recess 26 extends from the additional reference tooth 40 to the first tooth 36 in the circumferential direction D1. The additional reference tooth 40 is provided in the third upshifting facilitation recess 26C. The third upshifting facilitation recess 26C is provided on the additional reference tooth 40. In this embodiment, the additional reference tooth 40 has an outline which is substantially identical to an outline of the reference tooth 34 when viewed from the axial direction D2. However, the additional reference tooth 40 can have an outline different from the outline of the reference tooth 34. Furthermore, the additional reference tooth 40 can be omitted from the bicycle sprocket S7.

Figure 9:
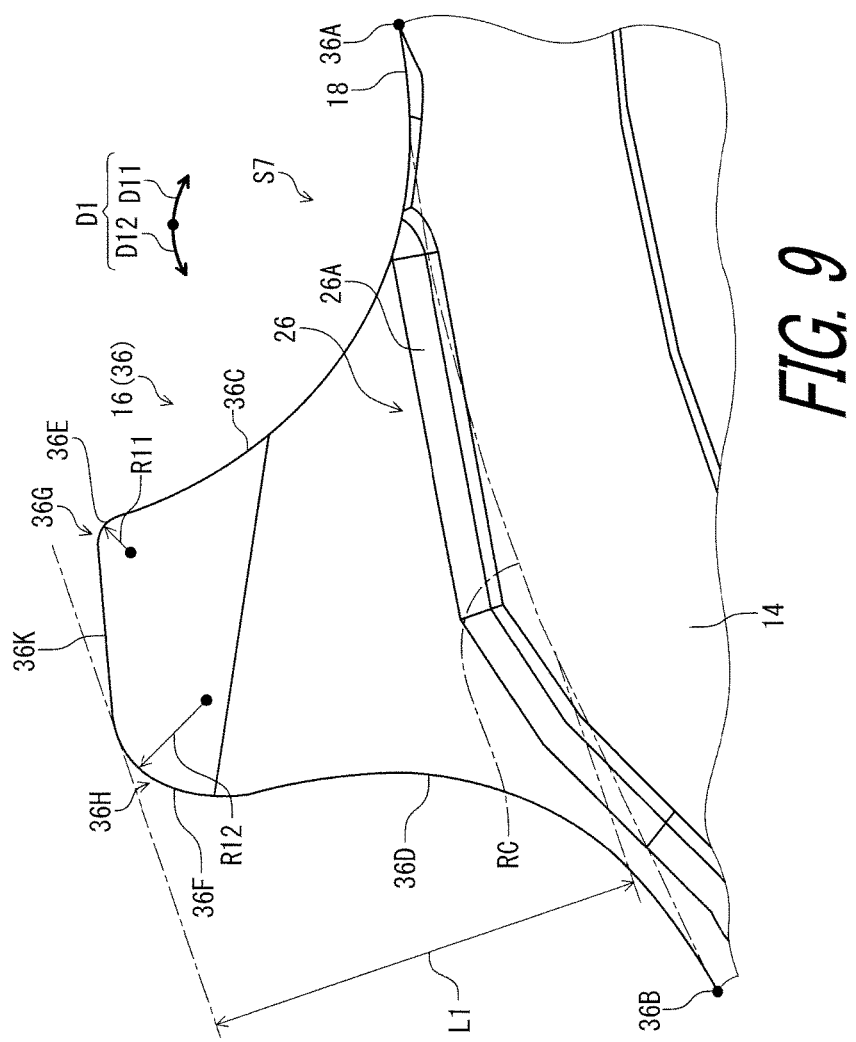
FIG. 9 is a partial enlarged side elevational view of a first tooth of the bicycle sprocket illustrated in FIG. 1.

As seen in FIG. 9, the first tooth 36 includes a first downstream tooth bottom 36A, a first upstream tooth bottom 36B, a first downstream circumferential surface 36C, a first upstream circumferential surface 36D, a first downstream outer corner 36E, and a first upstream outer corner 36F.

The first downstream tooth bottom 36A is provided on the radially outer periphery 18 of the sprocket body 14 to define a root circle RC. The first upstream tooth bottom 36B is provided on the radially outer periphery 18 of the sprocket body 14 to define the root circle RC. The root circle RC extends through the first downstream tooth bottom 36A and the first upstream tooth bottom 36B. In this embodiment, the root circle RC corresponds to the radially outer periphery 18 of the sprocket body 14.

The first downstream circumferential surface 36C faces in the driving rotational direction D11. The first downstream circumferential surface 36C extends from the first downstream tooth bottom 36A to a first downstream radially-outer end 36G of the first tooth 36. The first upstream circumferential surface 36D faces in a reversing rotational direction D12 opposite to the driving rotational direction D11. The first upstream circumferential surface 36D extends from the first upstream tooth bottom 36B to a first upstream radially-outer end 36H of the first tooth 36.

The first downstream outer corner 36E is provided at the first downstream radially-outer end 36G in the first downstream circumferential surface 36C. The first upstream outer corner 36F is provided at the first upstream radially-outer end 36H in the first upstream circumferential surface 36D. The first upstream outer corner 36F is positioned radially outward from the first downstream outer corner 36E.

As seen in FIG. 9, the first downstream outer corner 36E includes a first downstream curved edge having a first downstream curvature radius R11. The first upstream outer corner 36F includes a first upstream curved edge having a first upstream curvature radius R12. In this embodiment, the first upstream curvature radius R12 is different from the first downstream curvature radius R11. The first upstream curvature radius R12 is larger than the first downstream curvature radius R11. However, the first upstream curvature radius R12 can be equal to or smaller than the first downstream curvature radius R11. In this embodiment, the first upstream curvature radius R12 ranges from 0.5 mm to 3.0 mm. However, the first upstream curvature radius R12 is not limited to this range. For example, the first upstream curvature radius R12 can range from approximately 0.5 mm to approximately 3.0 mm. The first upstream curvature radius R12 can be smaller than 0.5 mm. The first upstream curvature radius R12 can be larger than 3.0 mm.

The first tooth 36 includes a first radially-outer end 36K defined by the first upstream radially-outer end 36H and the first downstream radially-outer end 36G to extend between the first upstream outer corner 36F and the first downstream outer corner 36E. In this embodiment, the first radially-outer end 36K linearly extends between the first upstream outer corner 36F and the first downstream outer corner 36E. The first radially-outer end 36K is inclined to gradually radially approach the root circle RC from the first upstream outer corner 36F to the first downstream outer corner 36E. However, the shape of the first radially-outer end 36K is not limited to this embodiment.

As seen in FIG. 9, the first tooth 36 has a first radial length L1 defined radially outward from the root circle RC of the bicycle sprocket S7. In this embodiment, the first radial length L1 is radially defined between the root circle RC and the first upstream outer corner 36F. The first radial length L1 is a maximum radial length defined radially from the root circle RC in the first tooth 36. The first radial length L1 can be radially defined between the root circle RC and another part of the first tooth 36 as the maximum radial length of the first tooth 36.

Figure 10:
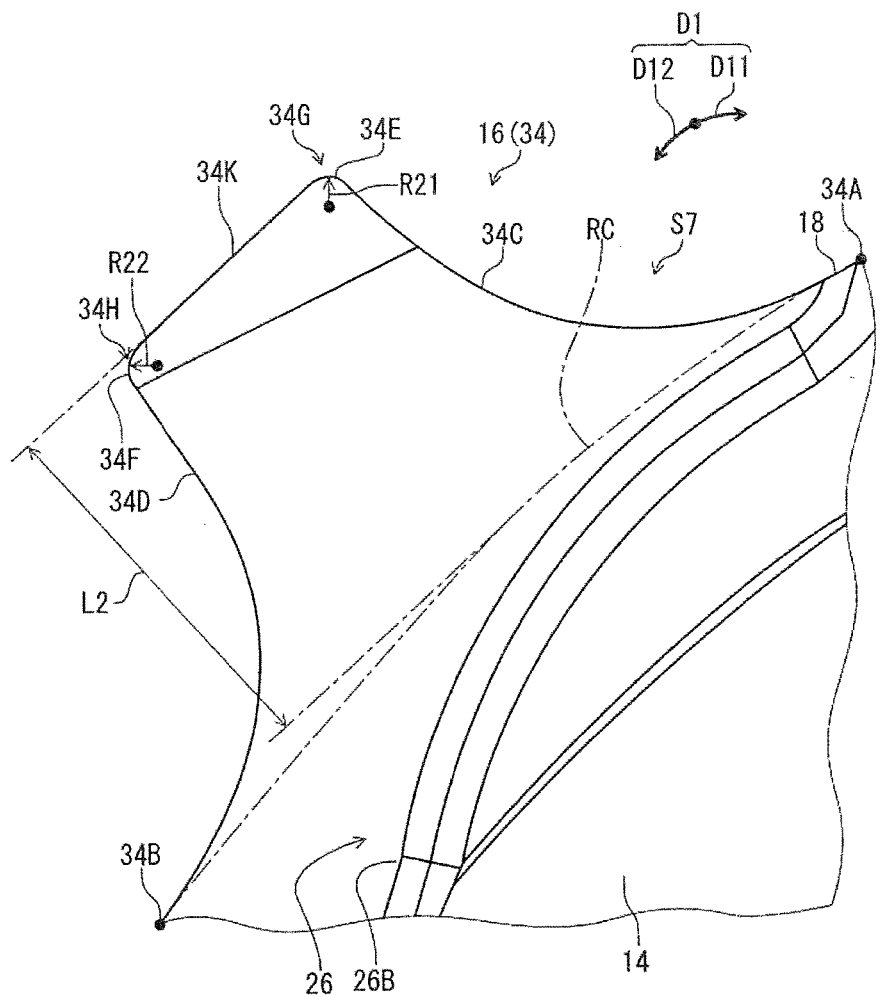
FIG. 10 is a partial enlarged side elevational view of a reference tooth of the bicycle sprocket illustrated in FIG. 1.

As seen in FIG. 10, the reference tooth 34 includes a reference downstream tooth bottom 34A, a reference upstream tooth bottom 34B, a reference downstream circumferential surface 34C, a reference upstream circumferential surface 34D, a reference downstream outer corner 34E, and a reference upstream outer corner 34F.

The reference downstream tooth bottom 34A is provided on the radially outer periphery 18 of the sprocket body 14 to define the root circle RC. The reference upstream tooth bottom 34B is provided on the radially outer periphery 18 of the sprocket body 14 to define the root circle RC. The root circle RC extends through the reference downstream tooth bottom 34A and the reference upstream tooth bottom 34B.

The reference downstream circumferential surface 34C faces in the driving rotational direction D11. The reference downstream circumferential surface 34C extends from the reference downstream tooth bottom 34A to a reference downstream radially-outer end 34G of the reference tooth 34. The reference upstream circumferential surface 34D faces in a reversing rotational direction D12 opposite to the driving rotational direction D11. The reference upstream circumferential surface 34D extends from the reference upstream tooth bottom 34B to a reference upstream radially-outer end 34H of the reference tooth 34.

The reference downstream outer corner 34E is provided at the reference downstream radially-outer end 34G in the reference downstream circumferential surface 34C. The reference upstream outer corner 34F is provided at the reference upstream radially-outer end 34H in the reference upstream circumferential surface 34D. The reference upstream outer corner 34F is positioned radially outward from the reference downstream outer corner 34E.

As seen in FIG. 10, the reference downstream outer corner 34E includes a reference downstream curved edge having a reference downstream curvature radius R21. The reference upstream outer corner 34F includes a reference upstream curved edge having a reference upstream curvature radius R22. In this embodiment, the reference upstream curvature radius R22 is equal to the reference downstream curvature radius R21. The first downstream curvature radius R11 is equal to each of the reference downstream curvature radius R21 and the reference upstream curvature radius R22. However, the reference upstream curvature radius R22 can be different from the reference downstream curvature radius R21. The first downstream curvature radius R11 can be different from at least one of the reference downstream curvature radius R21 and the reference upstream curvature radius R22.

The reference tooth 34 includes a reference radially-outer end 34K defined by the reference upstream radially-outer end 34H and the reference downstream radially-outer end 34G to extend between the reference upstream outer corner 34F and the reference downstream outer corner 34E. In this embodiment, the reference radially-outer end 34K has a curved shape extending between the reference upstream outer corner 34F and the reference downstream outer corner 34E. However, the shape of the reference radially-outer end 34K is not limited to this embodiment.

As seen in FIG. 10, the reference tooth 34 has a reference radial length L2 defined radially outward from the root circle RC of the bicycle sprocket S7. In this embodiment, the reference radial length L2 is radially defined between the root circle RC and the reference radially-outer end 34K. The reference radial length L2 is a maximum radial length defined radially from the root circle RC in the reference tooth 34. However, the reference radial length L2 can be radially defined between the root circle RC and another part of the reference tooth 34 as the maximum radial length of the reference tooth 34.

Figure 11:
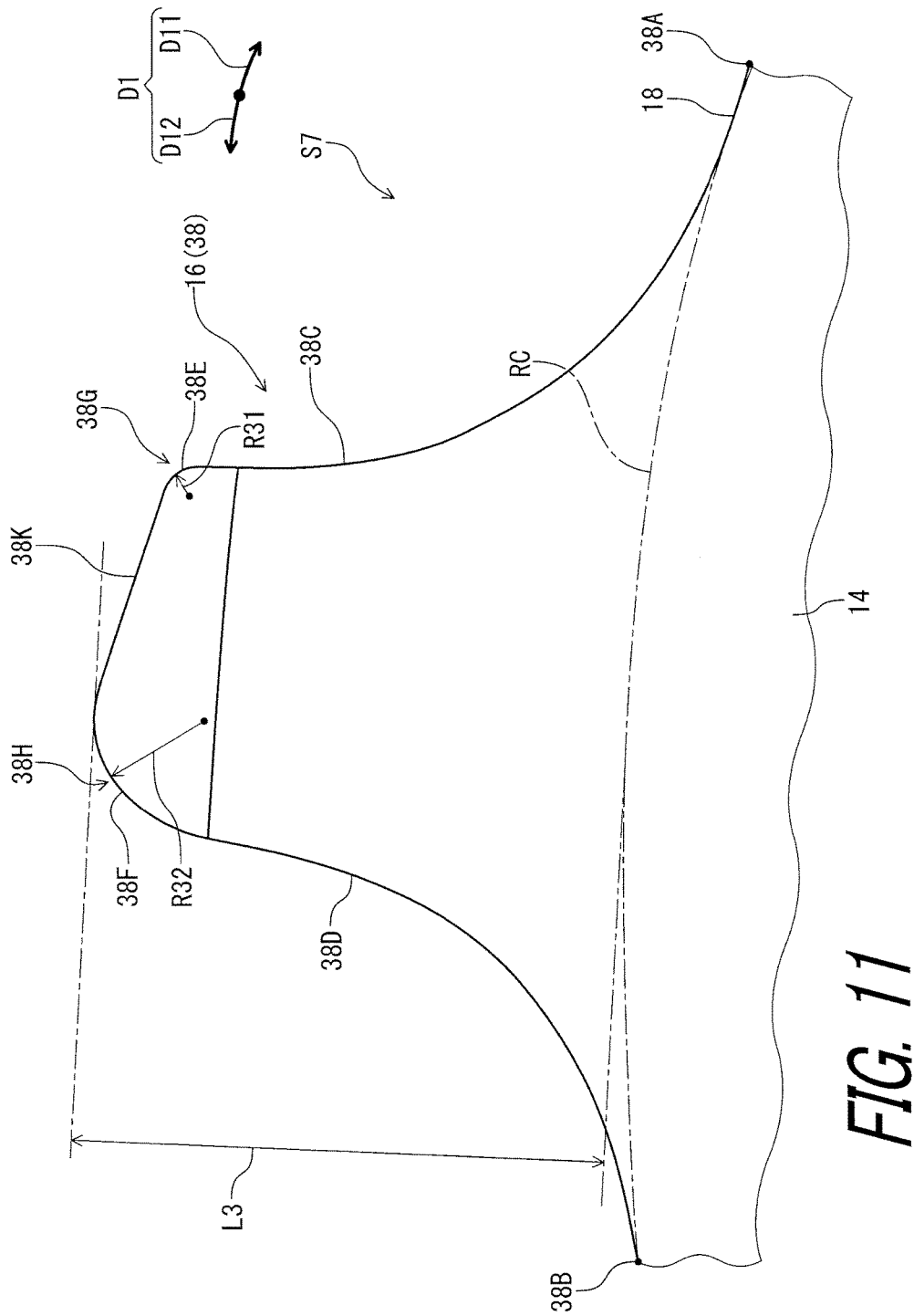
FIG. 11 is a partial enlarged side elevational view of a second tooth of the bicycle sprocket illustrated in FIG. 1.

As seen in FIG. 11, the second tooth 38 includes a second downstream tooth bottom 38A, a second upstream tooth bottom 38B, a second downstream circumferential surface 38C, a second upstream circumferential surface 38D, a second downstream outer corner 38E, and a second upstream outer corner 38F.

The second downstream tooth bottom 38A is provided on the radially outer periphery 18 of the sprocket body 14 to define the root circle RC. The second upstream tooth bottom 38B is provided on the radially outer periphery 18 of the sprocket body 14 to define the root circle RC. The second downstream circumferential surface 38C faces in the driving rotational direction D11. The second downstream circumferential surface 38C extends from the second downstream tooth bottom 38A to a second downstream radially-outer end 38G of the second tooth 38. The second upstream circumferential surface 38D faces in the reversing rotational direction D12 opposite to the driving rotational direction D11. The second upstream circumferential surface 38D extends from the second upstream tooth bottom 38B to a second upstream radially-outer end 38H of the second tooth 38.

The second downstream outer corner 38E is provided at the second downstream radially-outer end 38G of the second downstream circumferential surface 38C. The second upstream outer corner 38F is provided at the second upstream radially-outer end 38H of the second upstream circumferential surface 38D. The second upstream outer corner 38F is positioned radially outward from the second downstream outer corner 38E.

The second downstream outer corner 38E includes a second downstream curved edge having a second downstream curvature radius R31. The second upstream outer corner 38F includes a second upstream curved edge having a second upstream curvature radius R32. In this embodiment, the second upstream curvature radius R32 is different from the second downstream curvature radius R31. The second upstream curvature radius R32 is larger than the second downstream curvature radius R31. The second upstream curvature radius R32 can be equal to or smaller than the second downstream curvature radius R31. In this embodiment, the second upstream curvature radius R32 ranges from 0.5 mm to 3.0 mm. However, the second upstream curvature radius R32 is not limited to this range.

For example, the second upstream curvature radius R32 can range from approximately 0.5 mm to approximately 3.0 mm. The second upstream curvature radius R32 can be smaller than 0.5 mm. The second upstream curvature radius R32 can be larger than 3.0 mm.

The second tooth 38 includes a second radially-outer end 38K defined by the second upstream radially-outer end 38H and the second downstream radially-outer end 38G to extend between the second upstream outer corner 38F and the second downstream outer corner 38E. In this embodiment, the second radially-outer end 38K linearly extends between the second upstream outer corner 38F and the second downstream outer corner 38E. The second radially-outer end 38K is inclined to gradually radially approach the root circle RC from the second upstream outer corner 38F to the second downstream outer corner 38E. However, the shape of the second radially-outer end 38K is not limited to this embodiment.

The second tooth 38 has a second radial length L3 defined radially outward from the root circle RC. In this embodiment, the second radial length L3 is radially defined between the root circle RC and the second upstream outer corner 38F. The second radial length L3 is a maximum radial length defined radially from the root circle RC in the second tooth 38. However, the second radial length L3 can be radially defined between the root circle RC and another part of the second tooth 38 as the maximum radial length of the second tooth 38.

Figure 12:
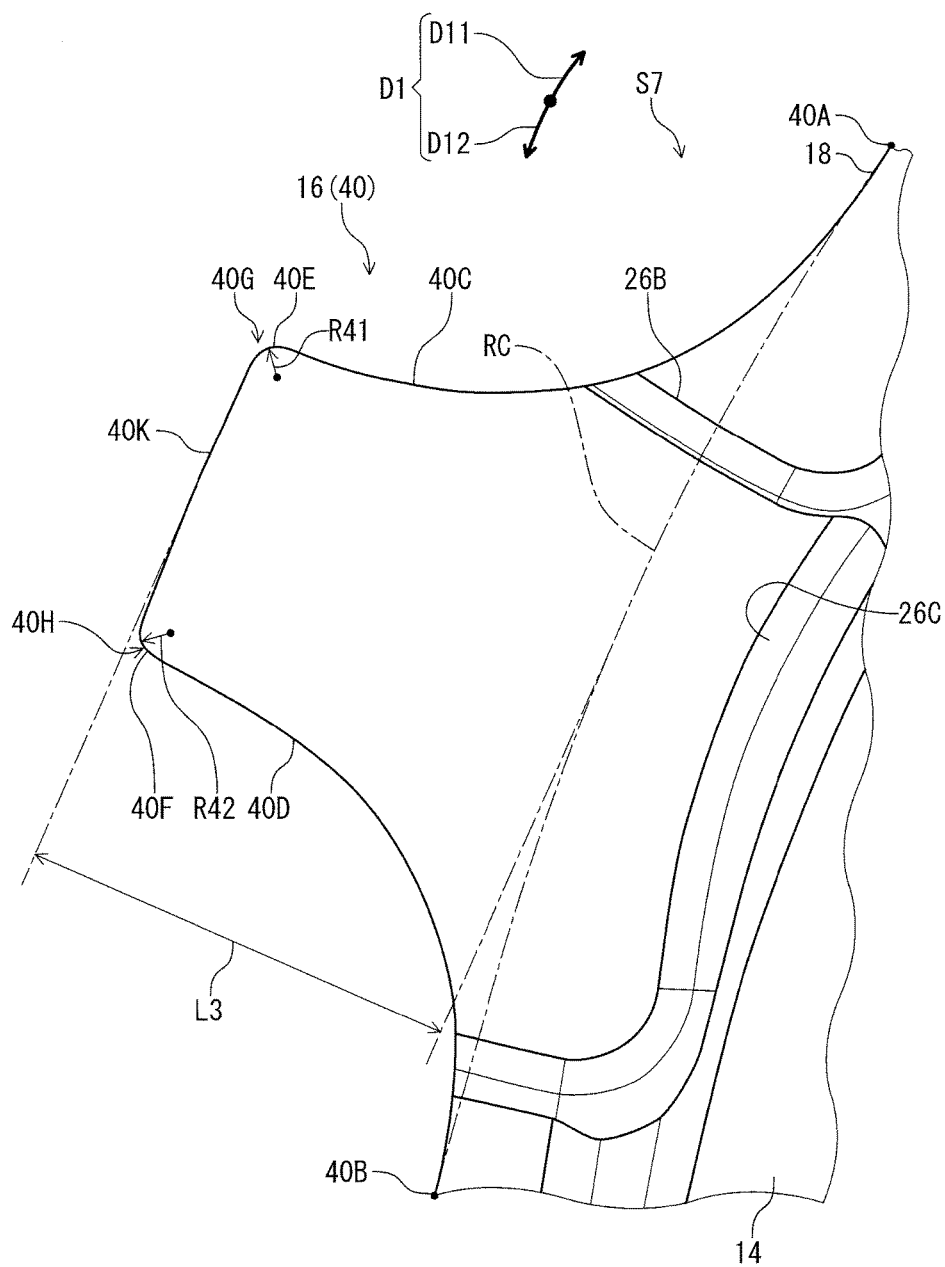
FIG. 12 is a partial enlarged side elevational view of an additional reference tooth of the bicycle sprocket illustrated in FIG. 1.

As seen in FIG. 12, the additional reference tooth 40 includes an additional reference downstream tooth bottom 40A, an additional reference upstream tooth bottom 40B, an additional reference downstream circumferential surface 40C, an additional reference upstream circumferential surface 40D, an additional reference downstream outer corner 40E, and an additional reference upstream outer corner 40F.

The additional reference downstream tooth bottom 40A is provided on the radially outer periphery 18 of the sprocket body 14 to define the root circle RC. The additional reference upstream tooth bottom 40B is provided on the radially outer periphery 18 of the sprocket body 14 to define the root circle RC. The root circle RC extends through the additional reference downstream tooth bottom 40A and the additional reference upstream tooth bottom 40B.

The additional reference downstream circumferential surface 40C faces in the driving rotational direction D11. The additional reference downstream circumferential surface 40C extends from the additional reference downstream tooth bottom 40A to an additional reference downstream radially-outer end 40G of the additional reference tooth 40. The additional reference upstream circumferential surface 40D faces in the reversing rotational direction D12 opposite to the driving rotational direction D11. The additional reference upstream circumferential surface 40D extends from the additional reference upstream tooth bottom 40B to an additional reference upstream radially-outer end 40H of the additional reference tooth 40.

The additional reference downstream outer corner 40E is provided at the additional reference downstream radially-outer end 40G in the additional reference downstream circumferential surface 40C. The additional reference upstream outer corner 40F is provided at the additional reference upstream radially-outer end 40H in the additional reference upstream circumferential surface 40D. The additional reference upstream outer corner 40F is positioned radially outward from the additional reference downstream outer corner 40E.

As seen in FIG. 12, the additional reference downstream outer corner 40E includes an additional reference downstream curved edge having an additional reference downstream curvature radius R41. The additional reference upstream outer corner 40F includes an additional reference upstream curved edge having an additional reference upstream curvature radius R42. In this embodiment, the additional reference upstream curvature radius R42 is equal to the additional reference downstream curvature radius R41. The first downstream curvature radius R11 is equal to each of the additional reference downstream curvature radius R41 and the additional reference upstream curvature radius R42. However, the additional reference upstream curvature radius R42 can be different from the additional reference downstream curvature radius R41. The first downstream curvature radius R11 can be different from at least one of the additional reference downstream curvature radius R41 and the additional reference upstream curvature radius R42.

The additional reference tooth 40 includes an additional reference radially-outer end 40K defined by the additional reference upstream radially-outer end 40H and the additional reference downstream radially-outer end 40G to extend between the additional reference upstream outer corner 40F and the additional reference downstream outer corner 40E. In this embodiment, the additional reference radially-outer end 40K has a curved shape extending between the additional reference upstream outer corner 40F and the additional reference downstream outer corner 40E. However, the shape of the additional reference radially-outer end 40K is not limited to this embodiment.

As seen in FIG. 12, the additional reference tooth 40 has an additional reference radial length L4 defined radially outward from the root circle RC of the bicycle sprocket S7. In this embodiment, the additional reference radial length L4 is radially defined between the root circle RC and the additional reference radially-outer end 40K. The additional reference radial length L4 is a maximum radial length defined radially from the root circle RC in the additional reference tooth 40. However, the additional reference radial length L4 can be radially defined between the root circle RC and another part of the additional reference tooth 40 as the maximum radial length of the additional reference tooth 40.

As seen in FIG. 8, the first radial length L1 is larger than the reference radial length L2. In this embodiment, the first radial length L1 is larger than the reference radial length L2 by a radial length ranging from 0.5 mm to 1.0 mm. However, the first radial length L1 is not limited to this range. For example, the first radial length L1 can be larger than the reference radial length L2 by a radial length ranging from approximately 0.5 mm to approximately 1.0 mm. The first radial length L1 can be larger than the reference radial length L2 by a radial length smaller than 0.5 mm. The first radial length L1 can be larger than the reference radial length L2 by a radial length larger than 1.0 mm.

In this embodiment, the second radial length L3 is larger than the reference radial length L2. The second radial length L3 is equal to the first radial length L1. The second radial length L3 is larger than the reference radial length L2 by a radial length ranging from 0.5 mm to 1.0 mm. However, the second radial length L3 can be equal to or smaller than the reference radial length L2. The second radial length L3 is not limited to this range. For example, the second radial length L3 can be larger than the reference radial length L2 by a radial length ranging from approximately 0.5 mm to approximately 1.0 mm. The second radial length L3 can be larger than the reference radial length L2 by a radial length smaller than 0.5 mm. The second radial length L3 can be larger than the reference radial length L2 by a radial length larger than 1.0 mm.

In this embodiment, the additional reference radial length L4 is equal to the reference radial length L2. However, the additional reference radial length L4 can be different from the reference radial length L2.

Figure 13:
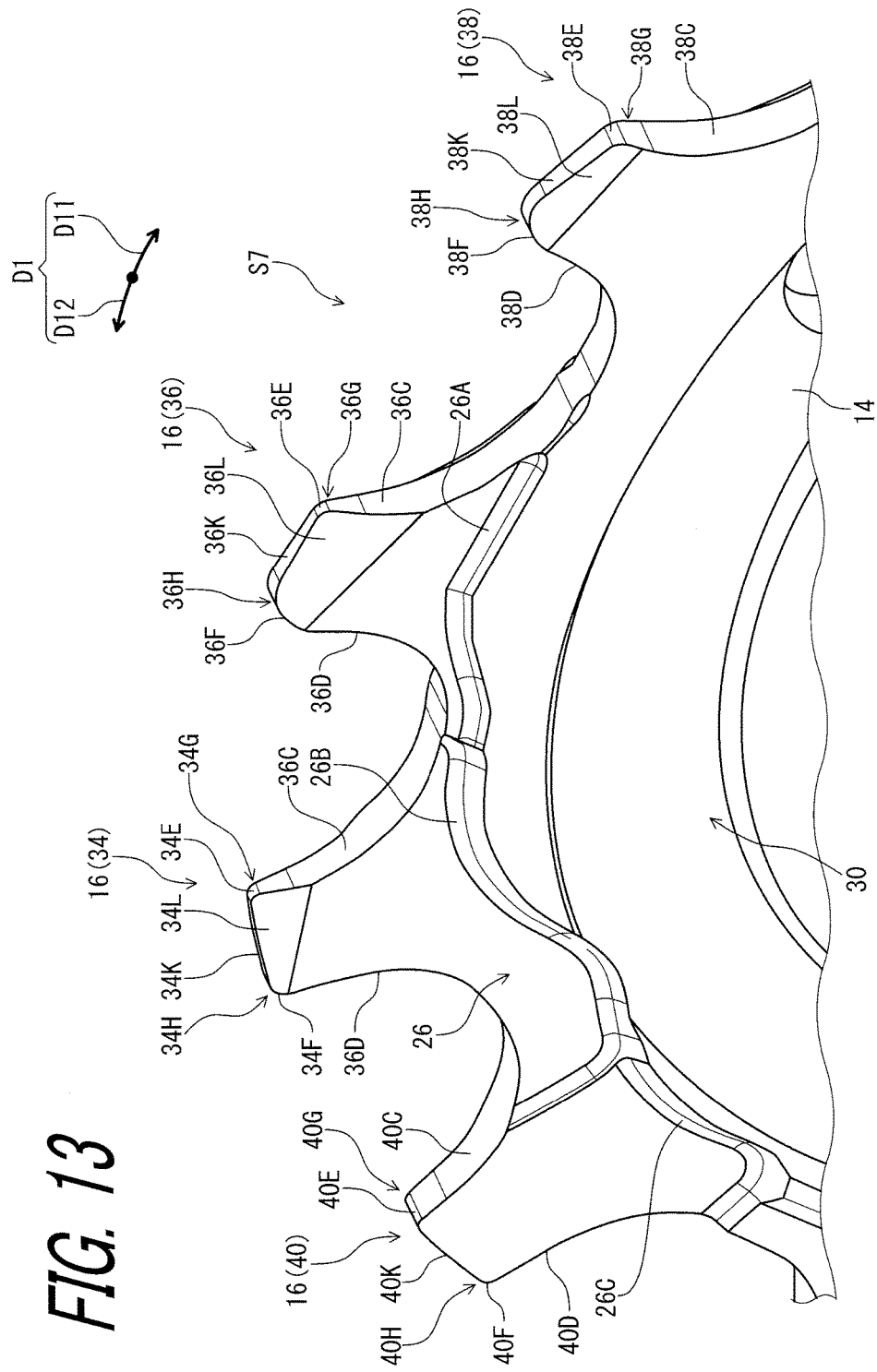
FIG. 13 is a partial perspective view of the bicycle sprocket of the bicycle multiple sprocket assembly illustrated in FIG. 1.

As seen in FIG. 13, the reference tooth 34 includes a reference inclined surface 34L. The first tooth 36 includes a first inclined surface 36L. The second tooth 38 includes a second inclined surface 38L. An area of the first inclined surface 36L is larger than an area of the second inclined surface 38L. The reference inclined surface 34L, the first inclined surface 36L, and the second inclined surface 38L are provided on the first side surface 30 of the bicycle sprocket S7. At least one of the reference inclined surface 34L, the first inclined surface 36L, and the second inclined surface 38L can be omitted from the bicycle sprocket S7.

Figure 14:
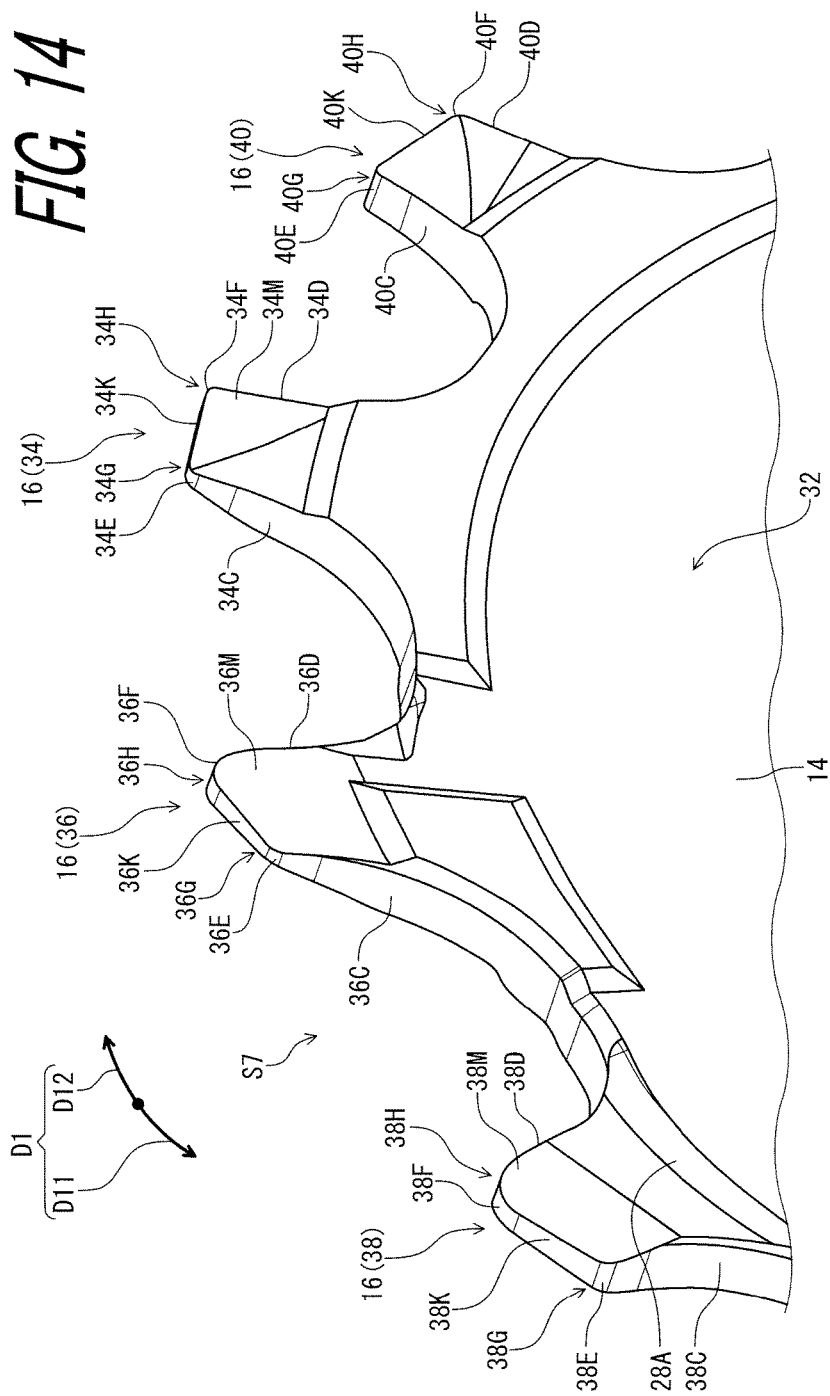
FIG. 14 is another partial perspective view of the bicycle sprocket of the bicycle multiple sprocket assembly illustrated in FIG. 1.

As seen in FIG. 14, the reference tooth 34 includes an additional reference inclined surface 34M. The first tooth 36 includes a first additional inclined surface 36M. The second tooth 38 includes a second additional inclined surface 38M. An area of the first additional inclined surface 36M is larger than an area of the second additional inclined surface 38M. The additional reference inclined surface 34M, the first additional inclined surface 36M, and the second additional inclined surface 38M are provided on the second side surface 32 of the bicycle sprocket S7. At least one of the additional reference inclined surface 34M, the first additional inclined surface 36M, and the second additional inclined surface 38M can be omitted from the bicycle sprocket S7.

Figure 15:
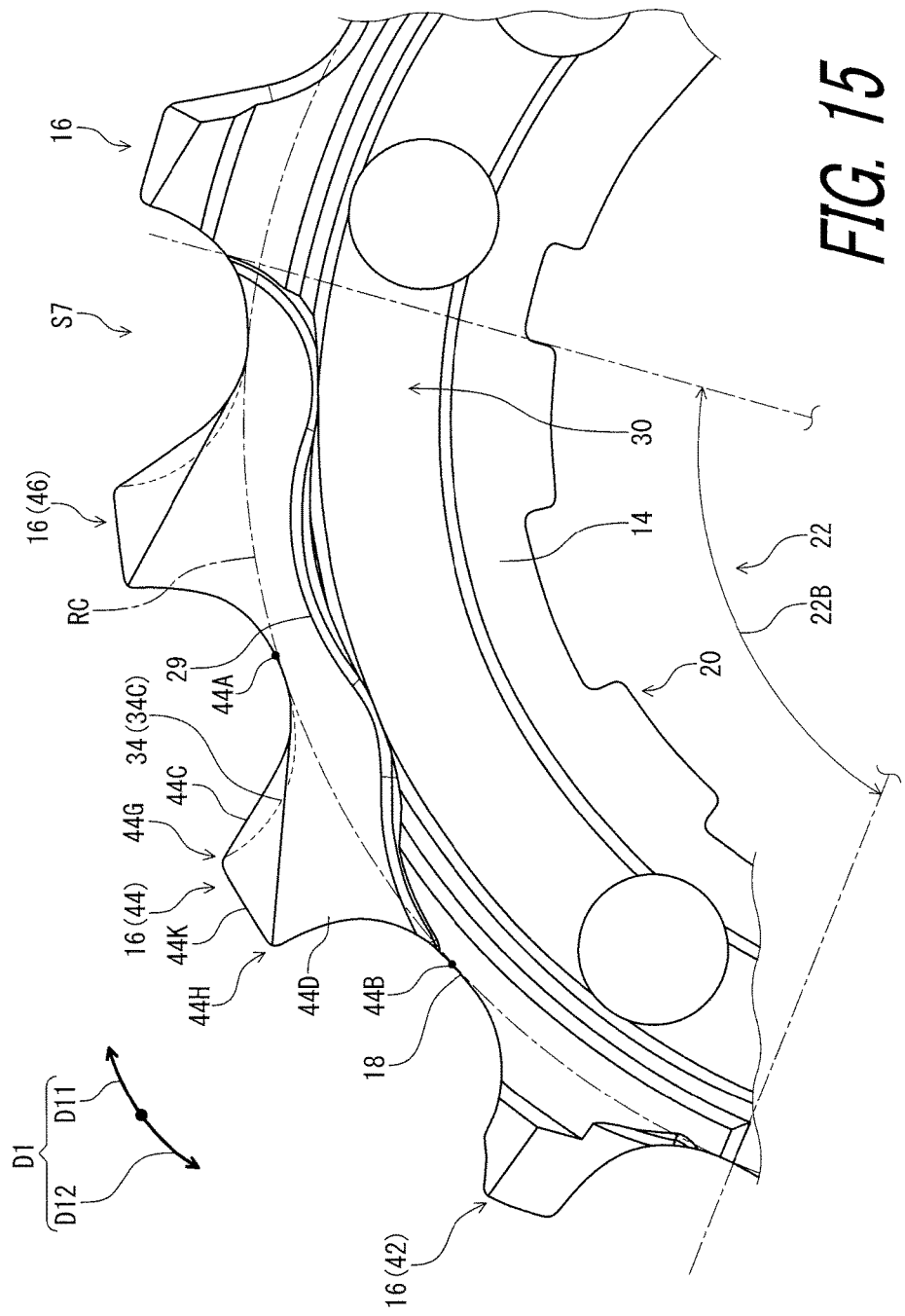
FIG. 15 is a partial side elevational view of the bicycle sprocket of the bicycle multiple sprocket assembly illustrated in FIG. 1.

As seen in FIG. 15, the plurality of chain-driving teeth 16 comprises a first downshifting facilitation tooth 42, a second downshifting facilitation tooth 44, and a third downshifting facilitation tooth 46. The first downshifting facilitation tooth 42, the second downshifting facilitation tooth 44, and the third downshifting facilitation tooth 46 are disposed in the shifting facilitation area 22 (FIG. 3) to facilitate the downshifting operation. In this embodiment, the first downshifting facilitation tooth 42, the second downshifting facilitation tooth 44, and the third downshifting facilitation tooth 46 are provided in the downshifting facilitation area 22B. The second downshifting facilitation tooth 44 and the third downshifting facilitation tooth 46 are provided in the downshifting facilitation recess 29. The first downshifting facilitation tooth 42 is provided outside the downshifting facilitation recess 29. The first downshifting facilitation tooth 42 first catches the bicycle chain C in the downshifting operation among the plurality of chain-driving teeth 16.

The second downshifting facilitation tooth 44 is disposed on a downstream side of the first downshifting facilitation tooth 42 in the driving rotational direction D11. The second downshifting facilitation tooth 44 is adjacent to the first downshifting facilitation tooth 42 in the circumferential direction D1 without another tooth between the first downshifting facilitation tooth 42 and the second downshifting facilitation tooth 44. The third downshifting facilitation tooth 46 is disposed on a downstream side of the second downshifting facilitation tooth 44 in the driving rotational direction D11. The third downshifting facilitation tooth 46 is adjacent to the second downshifting facilitation tooth 44 in the circumferential direction D1 without another tooth between the second downshifting facilitation tooth 44 and the third downshifting facilitation tooth 46.

As seen in FIG. 15, the second downshifting facilitation tooth 44 includes a downstream tooth bottom 44A, an upstream tooth bottom 44B, a downstream circumferential surface 44C, and an upstream circumferential surface 44D. The downstream tooth bottom 44A is provided on the radially outer periphery 18 of the sprocket body 14 to define the root circle RC. The upstream tooth bottom 44B is provided on the radially outer periphery 18 of the sprocket body 14 to define the root circle RC. The root circle RC extends through the downstream tooth bottom 44A and the upstream tooth bottom 44B.

The downstream circumferential surface 44C faces in the driving rotational direction D11. The downstream circumferential surface 44C extends from the downstream tooth bottom 44A to a downstream radially-outer end 44G of the second downshifting facilitation tooth 44. The upstream circumferential surface 44D faces in a reversing rotational direction D12 opposite to the driving rotational direction D11. The upstream circumferential surface 44D extends from the upstream tooth bottom 44B to an upstream radially-outer end 44H of the second downshifting facilitation tooth 44. The second downshifting facilitation tooth 44 includes a radially-outer end 44K defined by the upstream radially-outer end 44H and the downstream radially-outer end 44G.

The upstream circumferential surface 44D and the radially-outer end 44K provide an outline which is partly identical to an outline of the reference tooth 34 (FIG. 12) when viewed from the axial direction D2. However, the downstream circumferential surface 44C provides an outline which is different from the outline of the reference tooth 34 (the reference downstream circumferential surface 34C) (FIG. 12) when viewed from the axial direction D2. In this embodiment, the downstream circumferential surface 44C provides an area of the second downshifting facilitation tooth 44 which is larger than an area of the reference tooth 34 when viewed from the axial direction D2. This improves the strength of the second downshifting facilitation tooth 44 even if the downshifting facilitation recess 29 reduces an axial thickness of the second downshifting facilitation tooth 44.

The third downshifting facilitation tooth 46 has a shape which is substantially identical to a shape of the second downshifting facilitation tooth 44 when viewed from the axial direction D2. Thus, it will not be described in detail here for the sake of brevity.

Figure 16:
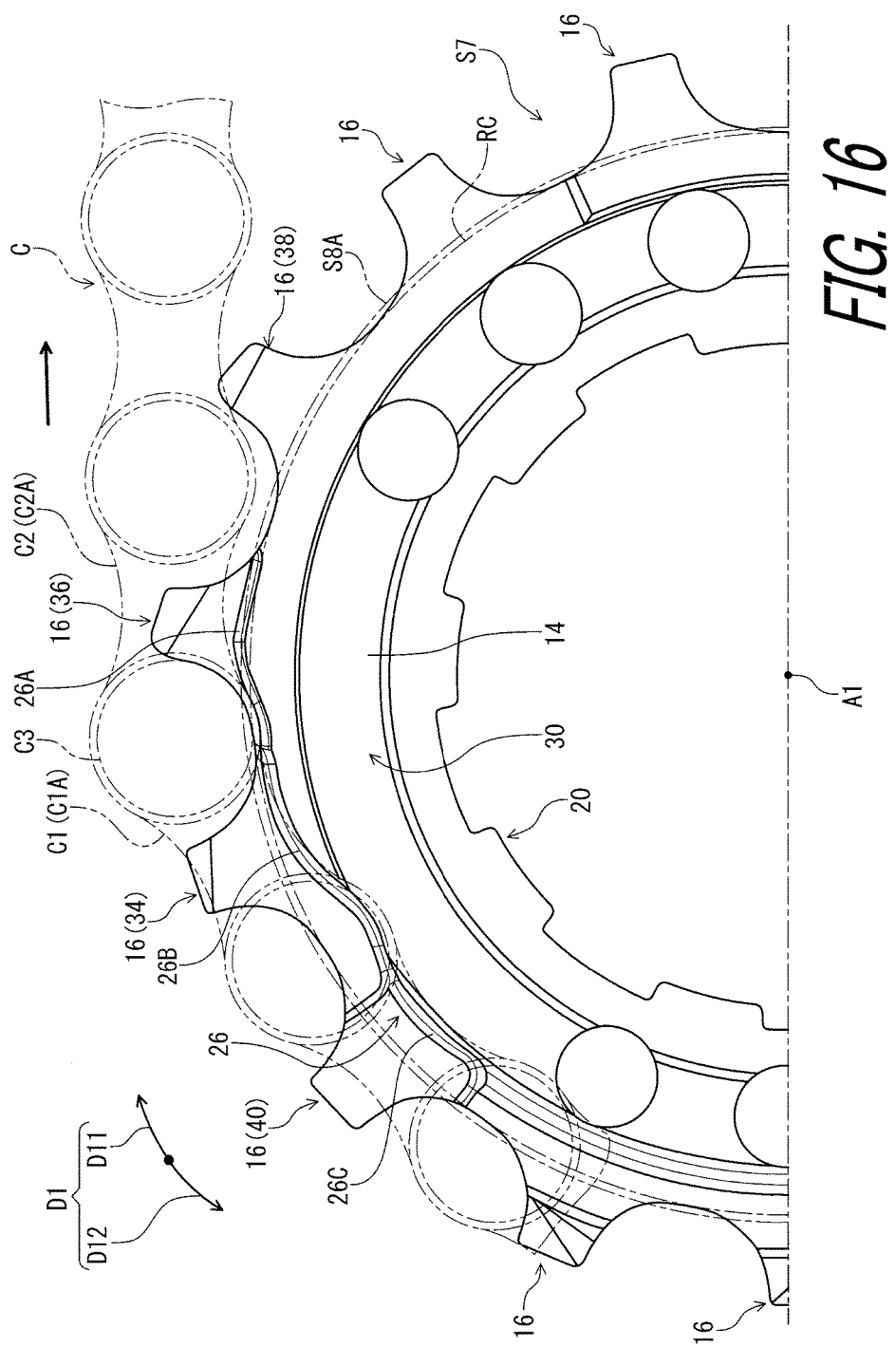
FIG. 16 is a partial side elevational view of the bicycle sprocket for showing an upshifting operation.

The upshifting operation of the bicycle chain C will be described below referring to FIGS. 16 to 18. In FIGS. 16 and 18, a circle S8A indicates a pitch circle of the smaller sprocket S8.

As seen in FIG. 16, for example, the bicycle chain C is first derailed from the bicycle sprocket S7 at the reference tooth 34 in the shifting facilitation area 22 when a rear derailleur RD (FIG. 2) shifts the bicycle chain C toward the smaller sprocket S8 in a state where the bicycle chain C is engaged with the bicycle sprocket S7. In this upshifting operation, an opposed pair of inner link plate C1 are disengaged from the reference tooth 34. As seen in FIG. 17, the bicycle chain C is last disengaged from the first tooth 36 when the bicycle sprocket S7. In this upshifting operation, an opposed pair of outer link plate C2 are disengaged from the first tooth 36. At this time, as seen in FIGS. 17 and 18, the tip (e.g., the first upstream radially-outer end 36H) of the first tooth 36 is likely to be unintentionally fitted between the inner link plate C1A and the outer link plate C2A near a roller C3 due to an axial force applied from the bicycle chain C to the first tooth 36.

Figure 17:
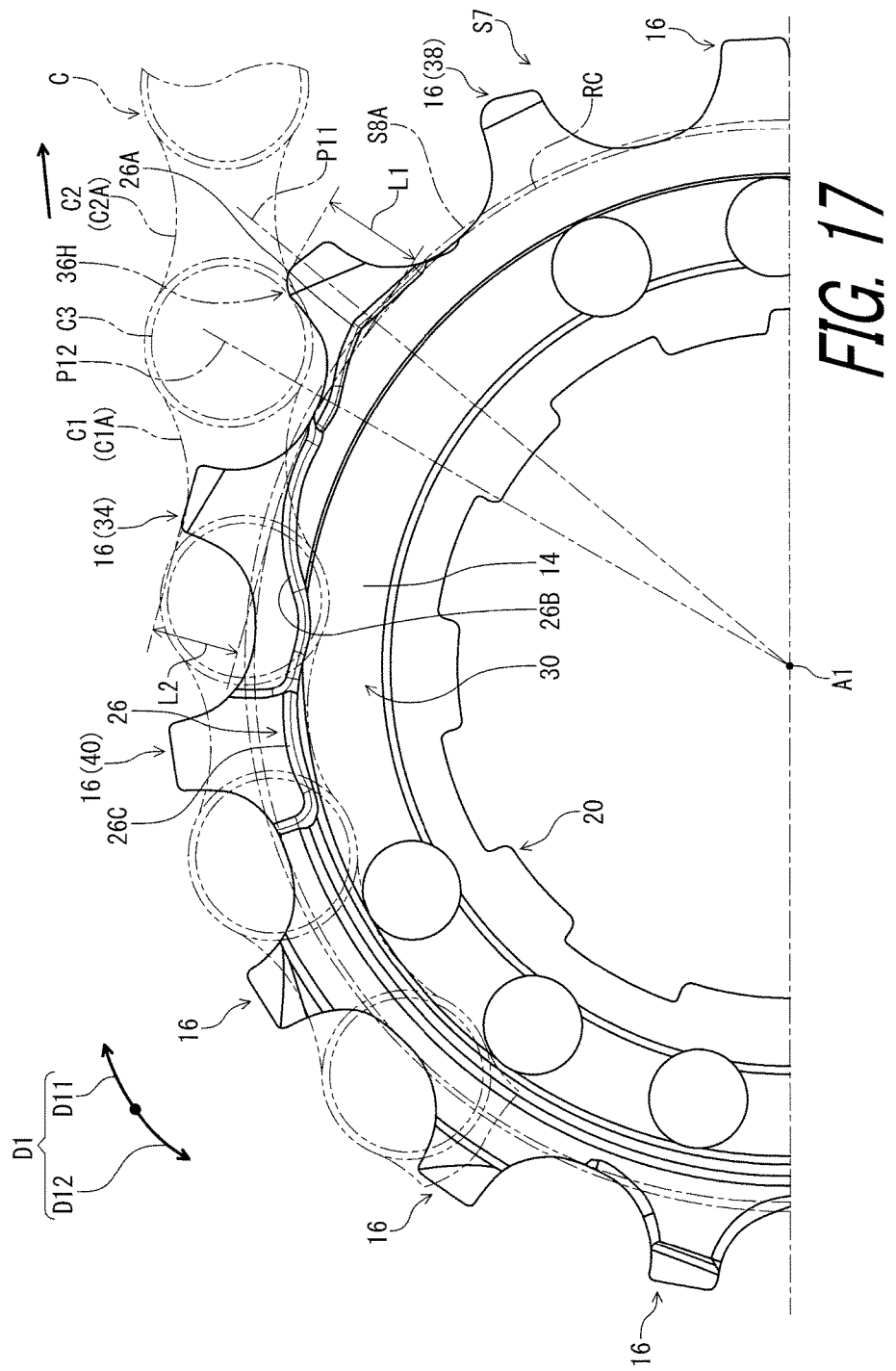
FIG. 17 is another partial side elevational view of the bicycle sprocket for showing the upshifting operation.
Figure 18:
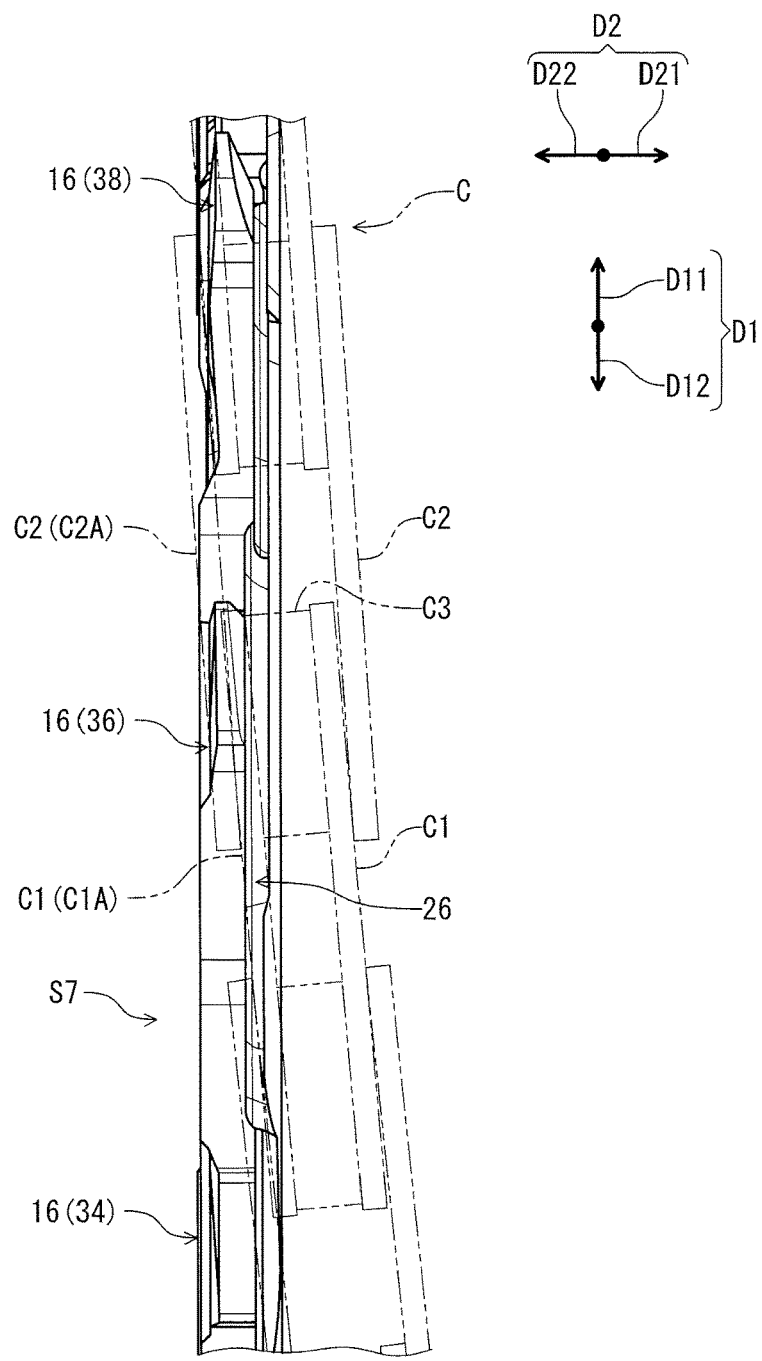
FIG. 18 is a plan view of the bicycle sprocket for showing the upshifting operation.

With the bicycle sprocket S7, however, since the first radial length L1 is larger than the reference radial length L2 as seen in FIG. 17, it is possible to delay a timing at which the first tooth 36 is disengaged from the bicycle chain C in comparison with the reference tooth 34 since the first radial length L1 of the first tooth 36 is larger than the reference radial length L2 of the reference tooth 34. This offsets a disengagement position P11 at which the first tooth 36 is disengaged from the bicycle chain C from a position P12 at which an axial force applied from the bicycle chain C to the first tooth 36 is larger than at disengagement position P11 during pedaling. This can reduce an axial force applied from the bicycle chain C to the first tooth 36 when the first tooth 36 is disengaged from the bicycle chain C when the bicycle chain C is shifted from the bicycle sprocket to an adjacent sprocket. Thus, it is possible to smoothen a shifting operation of the bicycle chain C.

The second tooth 38 has substantially the same effect as that of the first tooth 36 in a case where the bicycle chain C is first derailed from the bicycle sprocket S7 at the first tooth 36 in the shifting facilitation area 22. Thus, it will not be described in detail here for the sake of brevity.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket body including a radially outer periphery provided about a rotational center axis of the bicycle sprocket;
   a shifting facilitation area to facilitate a shifting operation of the bicycle chain, the shifting facilitation area having a shifting facilitation recess; and
   a plurality of chain-driving teeth provided on the radially outer periphery to engage with a bicycle chain, the plurality of chain-driving teeth comprising:
      a reference tooth provided in the shifting facilitation area, the reference tooth having a reference radial length defined radially outward from a root circle of the bicycle sprocket, the reference tooth including a reference downstream tooth bottom, a reference upstream tooth bottom, a reference downstream circumferential surface extending from the reference downstream tooth bottom and facing in a driving rotational direction in which the bicycle sprocket is rotated about the rotational center axis during pedaling, and a reference upstream circumferential surface extending from the reference upstream tooth bottom and facing in a reversing rotational direction opposite to the driving rotational direction; and
      a first tooth provided in the shifting facilitation area, the first tooth having a first radial length defined radially outward from the root circle of the bicycle sprocket, the first radial length being larger than the reference radial length, the first tooth being adjacent to the reference tooth in a circumferential direction defined about the rotational center axis without another tooth between the first tooth and the reference tooth, the first tooth being provided on a downstream side of the reference tooth in the driving rotational direction, the shifting facilitation recess extending at least from the reference tooth to the first tooth.

2. The bicycle sprocket according to claim 1, wherein the first radial length is larger than the reference radial length by a radial length ranging from 0.5 mm to 1.0 mm.

3. The bicycle sprocket according to claim 1, further comprising:
   a first side surface facing in a first axial direction parallel to the rotational center axis; and
   a second side surface facing in a second axial direction that is an axially reverse direction with respect to the first axial direction, wherein
   the shifting facilitation area is disposed on the first side surface.

4. The bicycle sprocket according to claim 1, wherein
   the plurality of chain-driving teeth comprise a second tooth provided in the shifting facilitation area,
   the second tooth has a second radial length defined radially outward from the root circle, and
   the second radial length is larger than the reference radial length.

5. The bicycle sprocket according to claim 4, wherein the second radial length is equal to the first radial length.

6. The bicycle sprocket according to claim 4, wherein the second radial length is larger than the reference radial length by a radial length ranging from 0.5 mm to 1.0 mm.

7. The bicycle sprocket according to claim 4, wherein the second tooth is provided on a downstream side of the first tooth in a driving rotational direction in which the bicycle sprocket is rotated about the rotational center axis during pedaling.

8. The bicycle sprocket according to claim 7, wherein the second tooth is adjacent to the first tooth in the driving rotational direction without another tooth between the reference tooth and the second tooth.

9. The bicycle sprocket according to claim 1, wherein the shifting facilitation area includes an upshifting facilitation area to facilitate an upshifting operation from the bicycle sprocket to a smaller sprocket adjacent to the bicycle sprocket without another sprocket between the smaller sprocket and the bicycle sprocket in the axial direction.

10. The bicycle sprocket according to claim 1, wherein the shifting facilitation area includes a downshifting facilitation area to facilitate a downshifting operation from a smaller sprocket to the bicycle sprocket, and the smaller sprocket is adjacent to the bicycle sprocket without another sprocket between the smaller sprocket and the bicycle sprocket in the axial direction.

11. The bicycle sprocket according to claim 1, wherein the reference tooth includes a reference downstream radially-outer end and a reference upstream radially-outer end,
the reference downstream circumferential surface extends from the reference downstream tooth bottom to the reference downstream radially-outer end,
the reference upstream circumferential surface extends from the reference upstream tooth bottom to the reference upstream radially-outer end, and
the reference tooth includes a reference downstream outer corner provided at the reference downstream radially-outer end and a reference upstream outer corner provided at the reference upstream radially-outer end.

12. A bicycle sprocket comprising:
a sprocket body including a radially outer periphery provided about a rotational center axis of the bicycle sprocket;
a shifting facilitation area to facilitate a shifting operation of the bicycle chain, the shifting facilitation area having a shifting facilitation recess; and
a plurality of chain-driving teeth provided on the radially outer periphery to engage with a bicycle chain, the plurality of chain-driving teeth comprising:
  a reference tooth provided in the shifting facilitation area, the reference tooth having a reference radial length defined radially outward from a root circle of the bicycle sprocket; and
  a first tooth provided in the shifting facilitation area, the first tooth having a first radial length defined radially outward from the root circle of the bicycle sprocket, the first radial length being larger than the reference radial length, the first tooth being adjacent to the reference tooth in a circumferential direction defined about the rotational center axis without another tooth between the first tooth and the reference tooth, the first tooth being provided on a downstream side of the reference tooth in a driving rotational direction in which the bicycle sprocket is rotated about the rotational center axis during pedaling, the shifting facilitation recess extending at least from the reference tooth to the first tooth, wherein
the first tooth includes
  a first downstream tooth bottom provided on the radially outer periphery of the sprocket body to define the root circle,
  a first upstream tooth bottom provided on the radially outer periphery of the sprocket body to define the root circle,
  a first downstream circumferential surface facing in the driving rotational direction, the first downstream circumferential surface extending from the first downstream tooth bottom to a first downstream radially-outer end of the first tooth,
  a first upstream circumferential surface facing in a reversing rotational direction opposite to the driving rotational direction, the first upstream circumferential surface extending from the first upstream tooth bottom to a first upstream radially-outer end of the first tooth,
  a first downstream outer corner provided at the first downstream radially-outer end in the first downstream circumferential surface, and
  a first upstream outer corner provided at the first upstream radially-outer end in the first upstream circumferential surface, the first upstream outer corner being positioned radially outward from the first downstream outer corner.

13. The bicycle sprocket according to claim 12, wherein
the first downstream outer corner includes a first downstream curved edge having a first downstream curvature radius,
the first upstream outer corner includes a first upstream curved edge having a first upstream curvature radius, and
the first upstream curvature radius is different from the first downstream curvature radius.

14. The bicycle sprocket according to claim 13, wherein the first upstream curvature radius is larger than the first downstream curvature radius.

15. The bicycle sprocket according to claim 13, wherein the first upstream curvature radius ranges from 0.5 mm to 3.0 mm.

16. The bicycle sprocket according to claim 12, wherein the first tooth includes a first radially-outer end defined by the first upstream radially-outer end and the first downstream radially-outer end to extend between the first upstream outer corner and the first downstream outer corner.

17. The bicycle sprocket according to claim 12, wherein the first radial length is radially defined between the root circle and the first upstream outer corner.

18. A bicycle sprocket comprising:
a sprocket body including a radially outer periphery provided about a rotational center axis of the bicycle sprocket;
a shifting facilitation area to facilitate a shifting operation of the bicycle chain, the shifting facilitation area having a shifting facilitation recess; and
a plurality of chain-driving teeth provided on the radially outer periphery to engage with a bicycle chain, the plurality of chain-driving teeth comprising:
  a reference tooth provided in the shifting facilitation area, the reference tooth having a reference radial length defined radially outward from a root circle of the bicycle sprocket; and
  a first tooth provided in the shifting facilitation area, the first tooth having a first radial length defined radially outward from the root circle of the bicycle sprocket, the first radial length being larger than the reference radial length, the first tooth being adjacent to the reference tooth in a circumferential direction defined about the rotational center axis without another tooth between the first tooth and the reference tooth, the first tooth being provided on a downstream side of the reference tooth in a driving rotational direction in which the bicycle sprocket is rotated about the rotational center axis during pedaling, the shifting facilitation recess extending at least from the reference tooth to the first tooth, wherein
the plurality of chain-driving teeth comprise a second tooth provided in the shifting facilitation area,
the second tooth has a second radial length defined radially outward from the root circle, and
the second radial length is larger than the reference radial length,
the second tooth includes
  a second downstream tooth bottom provided on the radially outer periphery of the sprocket body to define the root circle, a second upstream tooth bottom provided on the radially outer periphery of the sprocket body to define the root circle, a second downstream circumferential surface facing in the driving rotational direction, the second downstream circumferential surface extending from the second downstream tooth bottom to a second downstream radially-outer end of the second tooth, a second upstream circumferential surface facing in a reversing rotational direction opposite to the driving rotational direction, the second upstream circumferential surface extending from the second upstream tooth bottom to a second upstream radially-outer end of the second tooth, a second downstream outer corner provided at the second downstream radially-outer end of the second downstream circumferential surface, and a second upstream outer corner provided at the second upstream radially-outer end of the second upstream circumferential surface, the second upstream outer corner being positioned radially outward from the second downstream outer corner.

19. The bicycle sprocket according to claim 18, wherein the second downstream outer corner includes a second downstream curved edge having a second downstream curvature radius, the second upstream outer corner includes a second upstream curved edge having a second upstream curvature radius, and the second upstream curvature radius is different from the second downstream curvature radius.

20. The bicycle sprocket according to claim 19, wherein the second upstream curvature radius is larger than the second downstream curvature radius.

21. The bicycle sprocket according to claim 19, wherein the second upstream curvature radius ranges from 0.5 mm to 3.0 mm.

22. The bicycle sprocket according to claim 18, wherein the second tooth includes a second radially-outer end defined by the second upstream radially-outer end and the second downstream radially-outer end to extend between the second upstream outer corner and the second downstream outer corner.

23. The bicycle sprocket according to claim 18, wherein the second radial length is radially defined between the root circle and the second upstream outer corner.

\* \* \* \* \*